United States Patent
Wilsdorf

(10) Patent No.: US 7,777,383 B2
(45) Date of Patent: Aug. 17, 2010

(54) MP-A AND MP-T MACHINES, MULTIPOLAR MACHINES FOR ALTERNATING AND THREE-PHASE CURRENTS

(76) Inventor: Doris Wilsdorf, 2600 Barracks Rd., #278, Charlottesville, VA (US) 22901

(*) Notice: Subject to any disclaimer, the term of this patent is extended or adjusted under 35 U.S.C. 154(b) by 252 days.

(21) Appl. No.: 12/064,683

(22) PCT Filed: Aug. 24, 2005

(86) PCT No.: PCT/US2005/030186

§ 371 (c)(1),
(2), (4) Date: Apr. 2, 2008

(87) PCT Pub. No.: WO2007/024224

PCT Pub. Date: Mar. 1, 2007

(65) Prior Publication Data

US 2008/0246365 A1  Oct. 9, 2008

(51) Int. Cl.
*H02K 31/00* (2006.01)
*H02K 21/26* (2006.01)
*H02K 21/38* (2006.01)

(52) U.S. Cl. .............. 310/178; 310/156.38; 310/156.41
(58) Field of Classification Search ............ 310/156.38, 310/156.41, 178
See application file for complete search history.

(56) References Cited

U.S. PATENT DOCUMENTS

| | | | |
|---|---|---|---|
| 4,900,965 A | 2/1990 | Fisher | |
| 4,975,609 A * | 12/1990 | McKee | 310/178 |
| 5,032,748 A * | 7/1991 | Sakuraba et al. | 310/52 |
| 5,331,244 A | 7/1994 | Rabe et al. | |
| 6,727,632 B2 | 4/2004 | Kusase | |
| 2002/0135256 A1* | 9/2002 | Nikolic et al. | 310/178 |
| 2004/0100156 A1* | 5/2004 | Joho | 310/156.08 |
| 2007/0200452 A1 | 8/2007 | Graham et al. | |

* cited by examiner

*Primary Examiner*—Quyen Leung
*Assistant Examiner*—Jose A Gonzalez Quinones
(74) *Attorney, Agent, or Firm*—Oblon, Spivak, McClelland, Maier & Neustadt, L.L.P.

(57) ABSTRACT

MP-A and MP-T machines are members of the Multipolar (MP) family of electric motors/generators and have similarly low weight and high power densities. Their current tubes comprise conductive "S-ribbons" in electrically non-conductive material. S-ribbons are shaped so as in operation to periodically substantially overlap a multiplicity of neighboring zones of high magnetic B-field, alternating with gaps with low B in which B changes sign. Accordingly, MP-A and MP-T machines, respectively, generate AC and 3-phase current in the generator mode, and as motor are driven by AC or 3-phase at the appropriate frequency. Two modifications are introduced: (i) Machines with stationary magnet tubes/rotating current tube and (ii) machines with stationary current tube/rotating magnet tubes. The latter do not require electrical brushes and are eminently suited for simultaneous multiple uses. Also, these may operate while immersed in hostile fluids, including sea water.

20 Claims, 13 Drawing Sheets

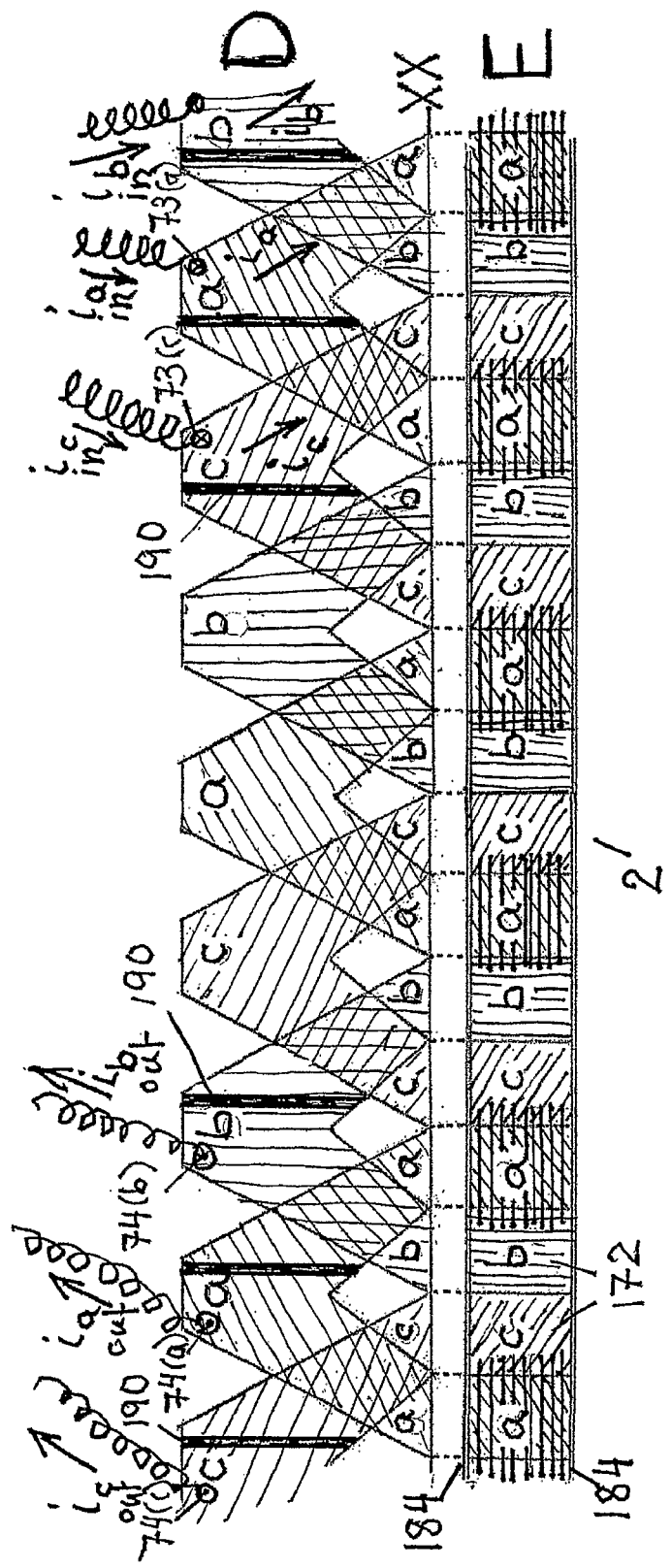
Figure 5D/E

MP-A AND MP-T MACHINES, MULTIPOLAR MACHINES FOR ALTERNATING AND THREE-PHASE CURRENTS

CROSS-REFERENCE TO RELATED APPLICATIONS

Related U.S. Patent Applications are

"Multipolar Machines—Optimized Homopolar Motors/Generators/Transformers," D. Kuhlmann-Wilsdorf, Patent Application, filed Jul. 8, 2003, PCT Application PCT/US03/22248.

"Multipolar-Plus Machines—Multipolar Machines with Reduced Numbers of Brushes," D. Kuhlmann-Wilsdorf, Patent Application, filed Jun. 29, 2005, PCT Application PCT/US2005/023245.

FIELD AND AIM OF THE INVENTION

The present invention expands the "multipolar machine" (MP machine) invention described in "Multipolar Machines—Optimized Homopolar Motors/Generators/Transformers," D. Kuhlmann-Wilsdorf, filed Jul. 8, 2003 and a follow-up invention described in "Multipolar-Plus Machines—Multipolar Machines with Reduced Numbers of Brushes" D. Kuhlmann-Wilsdorf. The present invention specifically seeks patent protection for MP-machines that are adapted to alternating (AC) and/or three-phase (3-phase) currents and are dubbed MP-A and MP-T machines, respectively, whereas MP and MP-Plus machines are adapted to DC currents.

Machines of the MP family share three basic construction features, including (A) a generally cylindrical current tube (the rotor in machines with brushes), that may be constituted of a unitary current tube or a set of concentric, mechanically fused but electrically insulated current tube layers, not necessarily of constant diameter, which current tube is capable of carrying current in substantially axial direction but not in substantially circumferential direction, (B) multiple magnetic field sources surrounding the current tube at the outside and inside such that they establish a magnetic flux density B in a multiplicity of axially extended zones in the wall of that current tube, which magnetic flux density alternates in radial orientation between neighboring zones; (C) means to direct a current to sequentially pass through a multiplicity of the zones such that the Lorentz force has the same sense of rotation everywhere.

In line with the above general description, typically, MP and MP-Plus machines comprise three concentric (rotationally symmetrical but not necessarily simply cylindrical) tubes that are centered on a common rotation axis. These are an outer and an inner magnet tube to which the magnetic field sources in the form of axially extended rows of permanent magnets are fastened such that radially correlated opposing magnet poles face each other across a gap with alternating polarity in neighboring rows to form axially extended zones of strong radial magnetic flux, B, and a current tube or current tube set that is capable of flowing current in the zones and of rotating relative to the rows of magnetic pole pairs in the gap between the inner and outer magnet tube.

As already indicated, the magnets in the magnet tubes are arranged so as to generate regularly spaced, axially extended "zones" that are penetrated by radial magnetic flux density, B, whose sign alternates from zone to zone. Further, simple MP and MP-Plus machines comprise "current channeling" current tubes that permit current flow only parallel to, but not normal to, the zones, and means to guide currents sequentially in "turns" through a plurality of zones such that the current direction changes as the direction of B changes, to the effect that the rotational direction of the Lorentz force on a current is the same over all successive "turns" of the current.

In simple MP machines, the means for guiding a current sequentially through a multiplicity of zones, are electrical brushes at each end of a zone that slide on slip rings on the outer current tube (rotor) surface and are pair-wise electrically connected. In MP-Plus machines a majority of these brushes are replaced by "flags" that connect equivalent points of neighboring zones in neighboring current tubes. In accord with the above characteristics, simple MP as well as MP-Plus machines are homopolar, i.e. the current path in them remains stationary while operating the machine. This feature confers extremely low electronic noise levels, i.e. permits military "stealth" and therefore is highly prized in the US Navy, when the machines are operated with DC current in contrast to rectified AC or three-phase current. In fact, simple MP and MP-Plus machines may, in the electric motor mode, be operated not only with direct current (DC), but also with rectified alternating current (AC) and/or three-phase current (3-Ph), but in the generator mode are capable of generating only DC current. They are therefore best described as "adapted" to DC.

The present invention retains the basic features labeled (A), (B) and (C) above but replaces metallic "current channeling" current tubes with current tubes comprising lengthwise extended sections of elongated conductors, dubbed "S-ribbons," that are continuous through a multiplicity of axially extended sections of a width and spacing coincident with those of the zones. Since on machine rotation, the resulting induced EMFs alternate, i.e. when consecutive segments of S-ribbons pass through a number of neighboring zones, on through gaps and followed by passage to the next set of neighboring zones, machines in accordance with the present invention are not homopolar but are "adapted to" AC with a single S-ribbon or, by the use of three regular placed independent S-ribbons, are "adapted to" 3-phase current. Thus the present invention is based on a different current tube (rotor) design than used in simple MP and MP-Plus machines. Even so, machines according to the present invention share the already listed features (A) and (B) of MP machines and therefore belong to the family of multipolar (MP) electrical machines.

Accordingly, one aim of the present invention is to broaden the range of MP machines to include AC-machines (MP-A machines) or three-phase-current-machines. (MP-T machines). An important secondary aim is to optionally eliminate the need for electrical brushes and slip rings which is done by rotating the magnet tubes instead of the current tube as has been done with simple MP and MP-Plus machines.

GENERAL DESCRIPTION OF THE INVENTION

According to the present invention the first aim, already indicated, is to achieve machines of multipolar (MP) type that are AC and/or 3-phase current machines, and that are controlled much like conventional AC and three-phase machines. This aim is achieved by means of current tubes that comprise at least one electrically conductive ribbon, dubbed an "S-ribbon," shaped so that, in rotation, it periodically substantially overlaps a multiplicity of adjoining zones, alternating with substantially overlapping gaps between the same adjoining zones. A gap is where the magnetic flux inverts direction. As a result, when connected to an external power source or sink, S-ribbons periodically conduct current along multiple zones of high magnetic flux and generate, or are subject to, Lorentz forces of same rotational direction along their whole length within the zones. On rotation, then, over much or most of their lengths, S-ribbons cycle between zones and gaps, wherein the Lorentz forces, alternate between maximum clockwise to zero and maximum anticlockwise or similarly induced voltages oscillate as in AC.

In addition, the second aim, namely MP machines that do not require any electric brushes, is achieved through reversing the relative motion between magnet tubes and current tubes versus the surroundings, so that the two magnet tubes spin with the machine axle (or at any rate if there should be no central axle relative to the stationary surroundings) and the current tube is stationary. Again, the relative motion between an S-ribbon and magnets cause the Lorentz force to oscillate when any chosen point on the current tube passes from one zone of magnetic flux between paired magnet poles through a gap to the next zone, i.e. which has the opposite direction of magnetic field.

MP machines as described and comprising a single S-ribbon may be operated with, or in the generator mode will deliver, AC current and therefore are dubbed MP-A machines as already noted. By molding two similar, regularly spaced S-ribbons into the current tube, the machine will generate two out-of-phase AC currents that may be used independent of each other. With three similar S-ribbons in the current tube, at ⅓ the spacing of neighboring zones of same polarity, a machine will generate three-phase power in the generator mode and can be operated with three-phase current in the motor mode. Such machines are dubbed MP-T machines. The speed as well as torque of MP-A and MP-T machines may be controlled via inverters, i.e. via frequency instead of voltage and current control as for MP and MP Plus machines.

Note that in the motor mode, both MP-A and MP-T machines can be driven by means of chopped and inverted DC current. Neither MP-A nor MP-T machines are homopolar, i.e. they will emit electrical noise. However, the electromagnetic noise level of MP-A as well as MP-T machines will be modest (i) because the dipolar arrangement of the poles in the rotating magnet tubes causes the magnetic fields of MP-A and MP-T machines to be short ranged, (ii) because the current direction in neighboring parallel segments of the S-ribbons alternates from one turn to the next, so that also the electromagnetic fields of the currents are short-ranged.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF PREFERRED EMBODIMENTS

Figure 1:
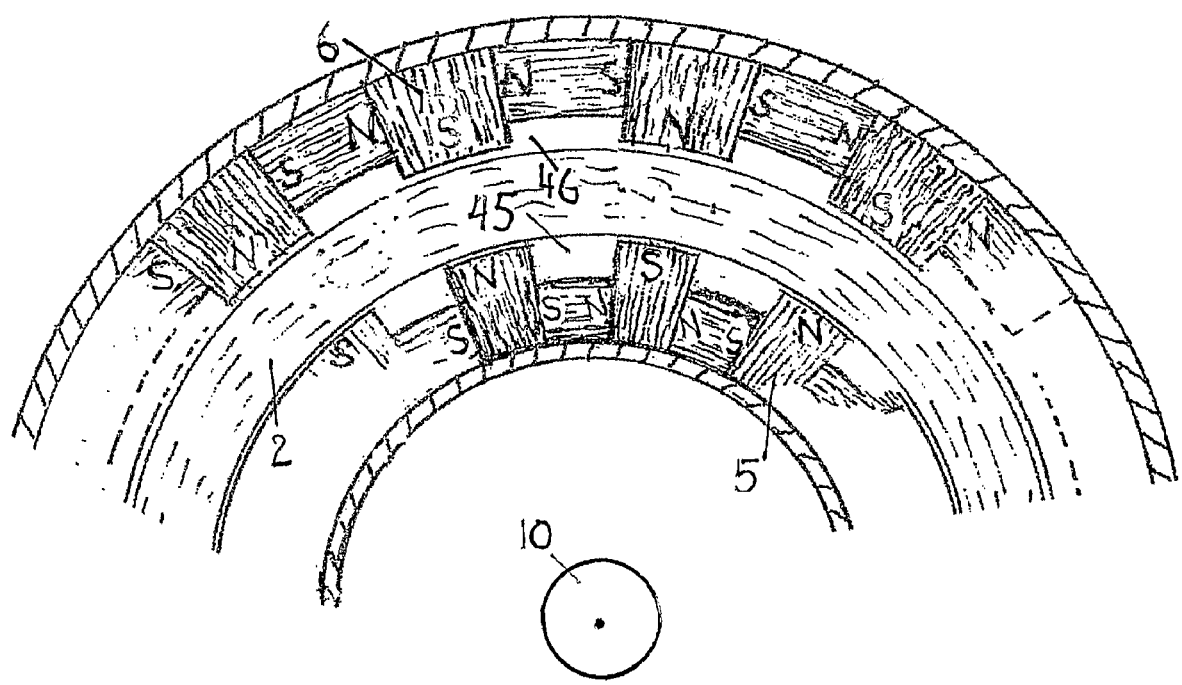
FIG. 1 shows part of a cross section of an MP, MP-Plus, MP-A or MP-T machine with magnets in a Hallbach arrangement.

Referring now to the drawings, wherein like reference numerals designate identical or corresponding parts throughout the several views, the present invention will now be described.

Basic Construction and Cooling of MP-A and MP-T Machines

FIG. 1 shows the basic MP-machine geometry in cross section, including machine axle 10, current tube 2 and inner and outer magnet tubes (5 and 6). The magnet arrangement is optional and is here shown as a Hallbach arrangement of alternating radial and tangential magnets as indicated by the N and S symbols (for "north" and "south") that show their respective direction of magnetization. As seen, this alternates between N poles of outer magnets 6 facing S poles on inner magnets 5 and vice versa. The areas between such magnetic pole pairs are the "zones" of strong radial magnetic flux density B whose sense of direction changes from one zone to the next, while the spaces, if any, between the zones are the "gaps" which may have low or no magnetic flux.

Channels 45 and 46 between neighboring radial magnets on either side of current tube 2 may favorably be employed for channeling cooling fluid in axial direction. Optionally, such channels may be open to the current tube surface as in FIG. 1 or they may be closed by some barrier, e.g. of fairly thin plastic sheet material.

In preferred embodiments, the channels are left open as in FIG. 1 and the cooling fluid is a liquid instead of a gas, e.g. is water instead of air. The use of water increases the efficiency of possible cooling. This aspect of MP machines has been discussed in the patent application ref. 1 as follows:

For any coolant flowing with velocity $v_C$ through cooling channels of cross sectional area $A_C$ so as to transport $V_C = A_C v_C$ of coolant volume per second, a temperature increase $\Delta T$ of the coolant removes heat at the rate of $$q[\text{watt}] = V_C c d \Delta T \tag{1}$$

where d is the mechanical density and c is the specific heat of the coolant. For water as a coolant, it is $d = 10^3$ kg/m$^3$ and $c = 1$ cal/(g °C.) = 4.2 [joule]/$10^{-3}$ [kg °C.] for $$q_{water} = 4.2 \times 10^6 [\text{joule}/°C.] V_C [\text{m}^3/\text{sec}] \Delta T [°C.] \tag{2}$$

Hence, for example, water cooling through an $A_C = 1$ cm$^2$ gap area per zone, at a flow rate of $v_C = 1$ m/sec = 2.3 mph for $V_C = 0.1$ liter/sec = $10^{-4}$ m$^3$/sec, with a $\Delta T = 10°$ C. temperature rise between inlet and outlet, will extract heat at the rate of $q_{water} = 4.2 \times 10^3$ watt $\cong 5.6$ hp. With the machine loss due to friction and Joule heat, $\mathcal{L}$, being typically only about 5% or less of the machine power, this means that the indicated 1 m/s water flow through 1 cm$^2$ cooling channel per zone, will at 10° C. temperature rise adequately cool a machine with $W_M > \sim 100$ hp per zone. This cooling rate will satisfy the needs for all but very large machines. Say, a $W_M = 100,000$ hp machine for a utility with $N_Z = 100$ zones might require a 1 m/sec water flow through an area of $A_C = 10$ cm$^2$ or a moderately faster flow or larger temperature rise with a smaller cooling channel cross section. Cooling with air, for which cd of eq. 1 is in the order of 1000 times smaller than for water, but which is amenable to much faster flows at comparable expenditure of pumping energy, can be similarly effective. These considerations apply independent of the particular construction of the current tube and thus apply also to MP-A and MP-T machines, except that their current tubes may become modestly hotter on account of their coverage with insulating material as well as the insulation between S-ribbons that are parallel to the current tube surfaces and thus transverse to the heat flow. Even so, on account of the typically small thickness of current tubes, and the fact that the bulk of the waste heat is generated in the current tube, cooling should always be easily accomplished.

For the case of water exposure, all surfaces of MP-A and MP-T machines will preferably be protected by a smooth, corrosion resistant and low-friction permanent covering, such as of paint, varnish, lacquer or any other protective coating that may be painted on, or sprayed or applied in any other desired suitable manner. Such a surface coating on both current tube surfaces, as well as all inner and outer magnet tube surfaces, will at the same time ward off internal short-circuits in the machine, and will assist in smooth relative motion of current tube and magnet tubes.

General Considerations on Rotating Current Tubes versus Rotating Magnet Tubes

Figure 2A:
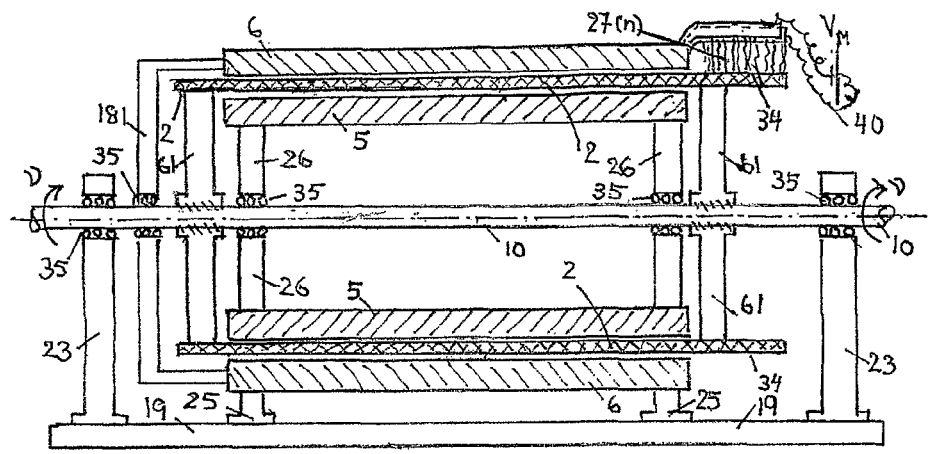
FIG. 2A is a schematic cross section of an MP machine in which the magnet tubes are stationary while the current tube is rigidly connected to, and rotates with, the axle.
Figure 2B:
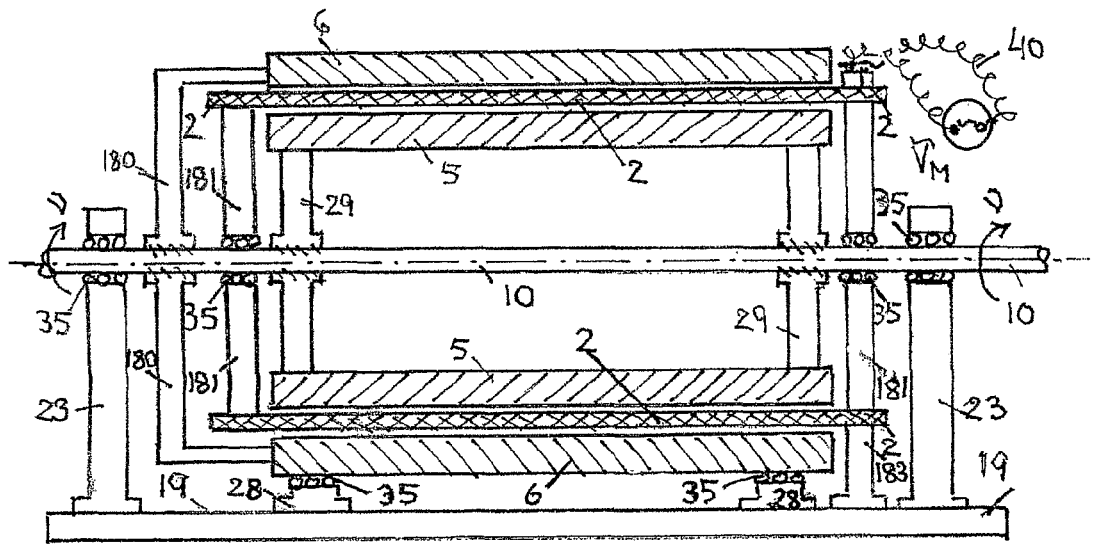
FIG. 2B is a schematic cross-section of an MP machine in which the current tube is stationary while the magnet tubes are rigidly connected to, and rotate with, the axle.
Figure 3A:
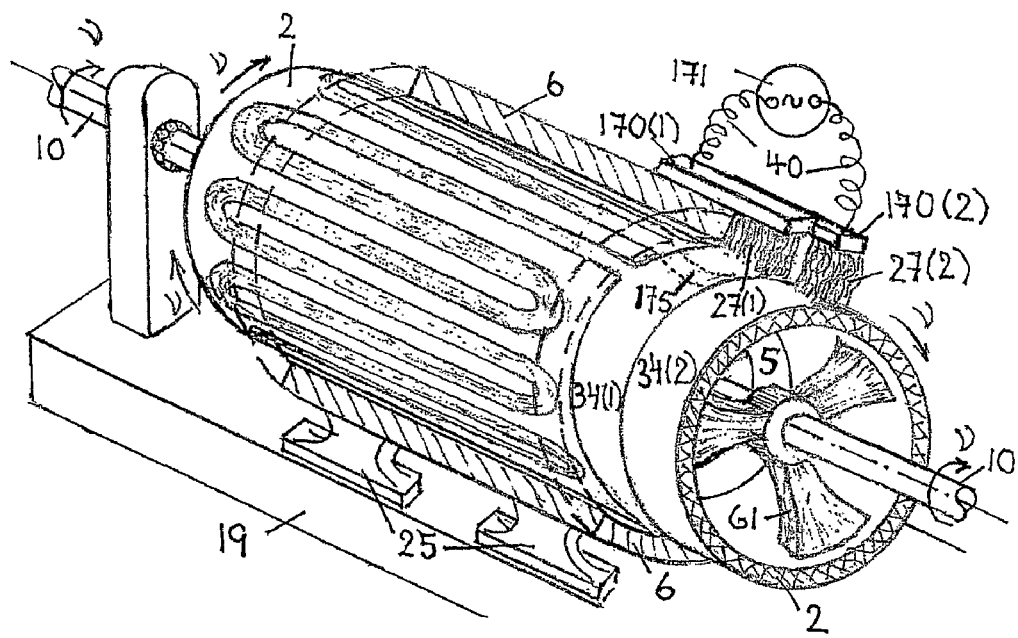
FIG. 3A is a perspective view with a partial cut-out of a machine as in FIG. 2A, wherein the current tube is of an insulating material in which an S-ribbon is embedded.
Figure 3B:
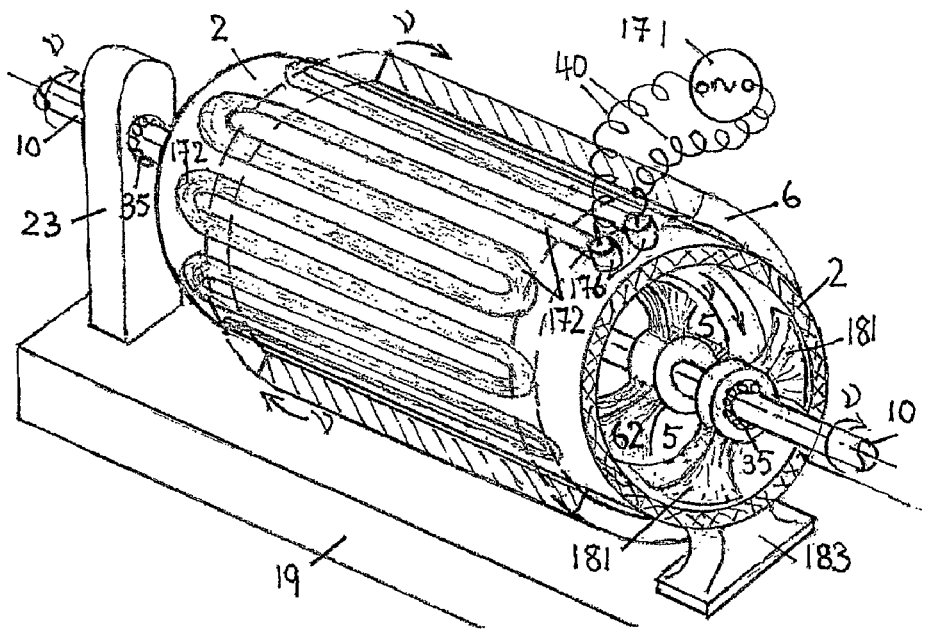
FIG. 3B is a perspective with a partial cut-out of a machine as in FIG. 2B, wherein the current tube is of an insulating material in which an S-ribbon is embedded.

FIGS. 2 and 3 clarify two possible basic geometries of simple cylindrical MP machines, namely (i) with rotating current tube in the gap between stationary magnet tubes (FIGS. 2A and 3A), and (ii) of stationary current tube and rotating outer and inner magnet tubes (FIGS. 2B and 3B). In the first case, i.e. in FIG. 2A, current tube 2 is rigidly fastened to machine axle 10, namely via drivers 61, so that in the motor mode it drives the axle rotation, and in the generator mode is driven by the axle. Meanwhile magnet tubes 5 and 6 are centered on the axle via low-friction bearings 35 but are mechanically anchored to the surroundings, e.g. the machine base plate 19 via supports 25 in FIG. 2A. In the second case, FIG. 2B, the roles are reversed. Now magnet tubes 5 and 6 are rigidly joined to axle 10 via parts 29 and 180 to drive axle 10 or be driven by it, in the motor and generator modes, respectively. Now current tube 2 is centered on, but does not rotate with, axle 10, namely via parts 181 and low-friction bearings 35. As indicated by the different power sources, i.e. DC in FIG. 2A and AC in FIG. 2B, current flows through the current tube, as is the case for all MP-machines, and therefore, in the case of FIG. 2A, has to be supplied to moving current tube 2 by brushes 27(*n*). However, to a stationary current tube, as in FIG. 2B, current may be supplied by means of stationary terminals in the motor mode, or power may be extracted from it through the same stationary terminals.

It may be noted that a central axle may not be needed and that anchoring to any other part of stationary surroundings of machines may be used to center rotating components, albeit probably not as satisfactorily. Anyway, from the mechanical viewpoint, either the current tube or the magnet tubes may rotate with or without a machine axle. The following are some pertinent general considerations.

Simple MP machines have rotationally symmetric current tubes as well as rotationally symmetric magnet tubes. The asymmetry imposed by stationary terminals to outside power supplies and/or customers is readily accommodated by rotating current tubes, the currents in which are fed to and/or extracted from the current tube (rotor) by means of electrical brushes. Also MP-Plus machines have rotationally symmetric current tubes but they do have asymmetric magnet tubes. These are pairs of N/S S/N poles side by side, relative to which the power terminals have to remain stationary. This situation, again, calls for rotating current tubes connected to the outside by means of sliding brushes. However, MP-A and MP-T machines have rotationally symmetrical magnet tubes but current tubes with built-in asymmetry, namely S-ribbons or S-ribbon sections with ends projecting beyond the zones. This situation permits both, rotating current tubes and rotating magnet tubes, as shown in FIGS. 3A and 3B. However, while the interconnections between rotating current tubes and stationary power supplies and/or customers again require sliding electrical brushes, as in FIG. 3A, stationary contact rings as in FIG. 3B can be supplied by means of stationary terminals, thereby eliminating slip rings and brushes.

In summary, the fundamental difference between MP and MP-Plus machines on the one hand, and MP-A and MP-T machines on the other hand, lies in the morphology of the current tube (2). The current tubes of MP and MP-Plus machines are rotationally symmetrical, as already indicated, whereas the current tubes of MP-A machines comprise at least one conductive S-ribbon 172 in an electrically insulating matrix (see FIG. 3), and the current tubes of MP-T machines contain three similar, regularly spaced S-ribbons in any one series of consecutive zones (see FIG. 4) each with two terminals for feeding current in and out.

Operation of MP-A and MP-T Machines

In the course of relative rotation between magnet tubes and current tubes, the axially aligned parts of S-ribbons periodically pass through zones of radial B flux, on to gaps, to zones of reversed B-polarity, to gaps, and on, always such that the Lorentz force due to different parts of any one S-ribbon, i.e. in neighboring zones, has the same rotational sense and voltages are additive. As a result, S-ribbons generate, or are subject to, alternating voltages. A single S-ribbon in a current tube will generate simple AC current when used as a generator and may be driven by simple AC current as a motor.

By using two similar but mutually insulated S-ribbons in the same current tube, with uniformly spaced axial sections, two independent AC voltages are induced that are 90° out of phase. Generators with two such S-ribbons may thus be used as two independent power sources, albeit of same frequency and power. Similarly, given phase control of the input power, motors with two S-ribbons could be optionally driven by one or two power sources of same controlled frequency and thereby be operated with the equivalent of "field weakening."

Figure 4:
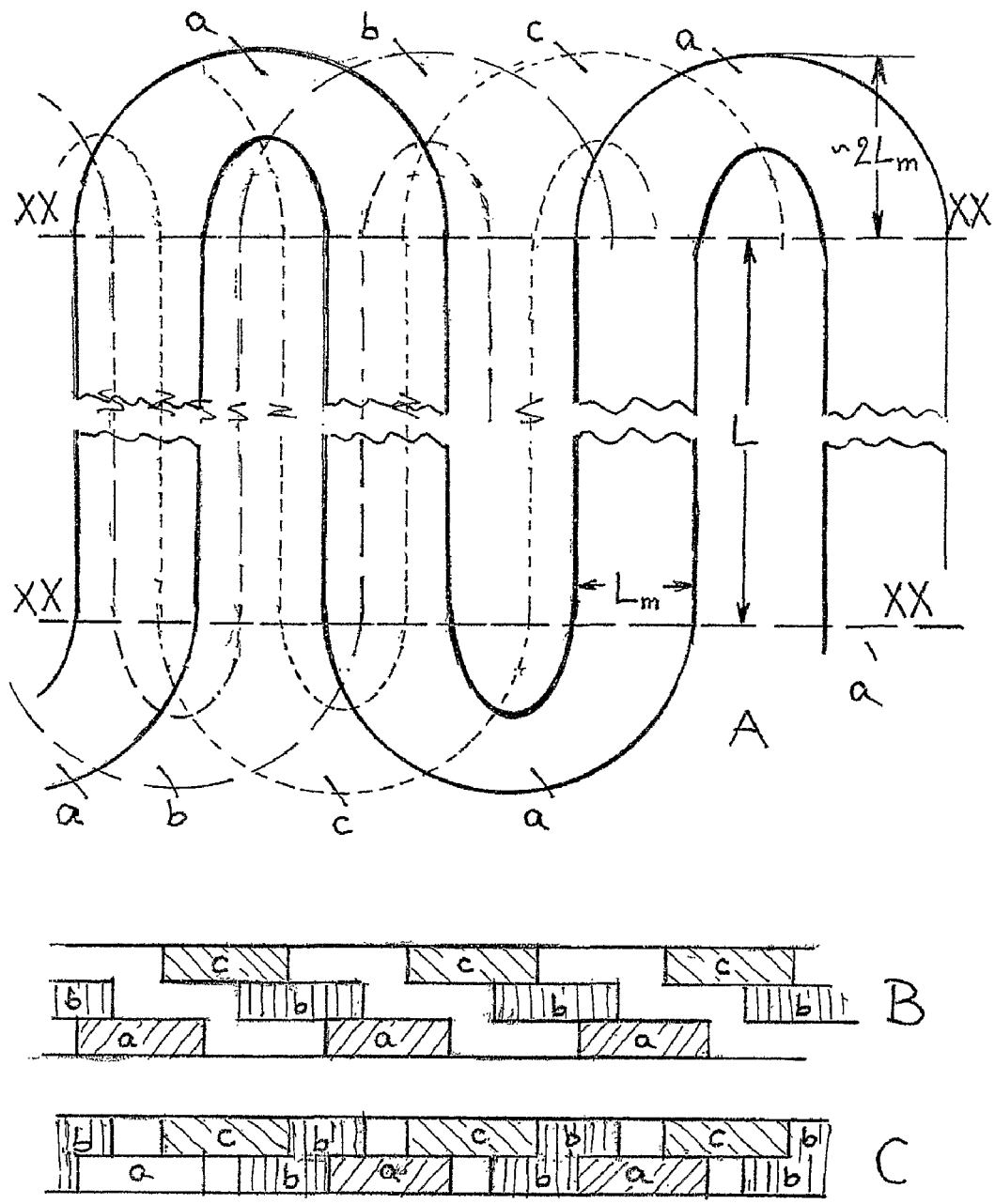
FIG. 4A is a schematic plan view of three S-ribbons in the current tube of an MP-T machine.
FIGS. 4B and 4C are flattened-out cross sections of S-ribbons in the current tube of an MP-T machine in three layers (B) and compacted into two layers (A).
FIG. 4D is a semi-schematic illustration of current flow in an MP-A machine with a current tube constituted of three concentric, mechanically fused but electrically insulated current tube layers.

Finally, three independent, similar, uniformly spaced S-ribbons in the same machine, as depicted in FIG. 4, will produce three-phase current in the generator mode and may be operated with three-phase current in the motor mode. Such machines are dubbed MP-T machines as already indicated above. These can be built with stationary magnet tubes and rotating S-ribbon current tubes, as in FIG. 3A, in which case slip rings and brushes are required. Sip rings and sliding electrical brushes become unnecessary, however, when stationary S-ribbon current tubes are used in conjunction with rotating magnet tubes, as in FIG. 3B.

A considerable aid in the construction of all MP machines is the fact that the two magnet tubes, i.e. the outer 6 and the inner magnet tube 5, remain closely aligned due to the strong magnetic attraction between the paired opposing N and S poles. This alignment persists up to the highest practicable currents strengths, as limited by the maximum machine torques that current tubes can support mechanically.

In FIG. 3A, with rotating current tube (rotor), brushes 27(1) and 27(2) are needed to lead currents into and out of the current tube (rotor). These brushes are rigidly connected to outer magnet tube 6 and slide on slip rings 34(1) and 34(2) situated on a projection of current tube 2 beyond the length of the magnet tubes. In the motor mode, current tube 2, and thence axle 10, spins on account of the Lorentz forces that act on the current through the radial magnetic flux between the opposing pole pairs in magnet tubes 5 and 6. These remain stationary, being mechanically anchored to the outside, in this figure via supports 25 on the base plate.

FIG. 3A shows a perspective view of the machine of FIG. 2A but with a partial cut-out of outer magnet tube 6 so as to reveal current tube 2 with embedded S-ribbon. Magnet tubes 5 and 6 remain in radial alignment on account of the strong mutual attraction of the paired magnetic poles in them, as already pointed out. These generate a radial flux density B of alternating sense of direction in parallel axially extended zones that in preferred positions coincide with the straight segments of the S-ribbon. Current tube 2 is rigidly connected to axle 10 via structures 61, while inner magnet tube 5 is centered on axle 10 via parts 26 and low-friction bearings 35 (not shown here but seen in FIG. 2A). Outer magnet tube 6 is centered on axle 10 and remains stationary, in this figure on account of parts 25 mounted on base plate 19 that also supports bearings 35 of axle 10 via support posts 23 in accord with FIG. 2A.

Electrically conductive but mutually electrically insulated slip rings 34(1) and 34(2) are formed from metal overlays on an extension of insulating current tube 2 with embedded S-ribbon. Slip ring 34(1) is directly electrically connected to one end of the S-ribbons as indicated in the drawing, while an extension of the other end of the S-ribbon is electrically connected to slip ring 34(2) via S-ribbon end part 175 that passes underneath slip ring 34(1) from which it is electrically insulated. Brushes 27(1) and 27(2) are rigidly mounted to, but electrically insulated from, outer magnet tube 6 or the machine housing or any other suitable stationary part. They slide on slip rings 34(1) and 34(2) via brush holders that are symbolized by strips 170(1) and 170(2) and comprise suitable brush loading springs or other devices not shown. Brushes 27(1) and 27(2) are electrically connected to the terminals of AC power supply 171 via cables 40 to power the machine in the motor mode. In the generator mode, power supply 171 is replaced by a power sink or consumer of the generated AC current.

In the case of an MP-T machine with stationary magnet tubes, current tube 2 will generate or use 3-phase current if it comprises not just one S-ribbon as in FIG. 3A, but three equally spaced, mutually insulated S-ribbons, such that electrically the phases of the generated or supplied current are spaced 120° apart. Mechanically/electrically changing an AC machine as of FIG. 3A to a three-phase machine, requires the provision of four additional slip rings, say, 34(3) to 34(6), plus four brushes, say, 27(3) to 27(6) that are connected to the terminals of the three poles of a three-phase power supply or three-phase consumer, in addition to brushes 27(1) and 26(2), shown in FIG. 3A. Also, the mutual insulation among all six slip rings and six brushes need to be maintained. Two simultaneous AC phases, whether electrically 180° or 120° apart, may be accomplished in the same manner but with only four mutually insulated brushes that slide on four mutually insulated slip rings.

Morphology and Operation of Individual "S-Ribbons"

As discussed, all MP-A and MP-T machines contain current tubes with conductive S-ribbons 172, that are shaped such that, periodically, they coincide with the zones within the magnet length of the inner and outer magnet tubes, whether through the rotation of the current tube or the rotation of the magnet tubes.

The width of an S-ribbon and of the gaps between adjacent turns of an S-ribbon, is preferably, but not necessarily, made equal to the magnet width as projected on the current tube mid-line, $L_m$, in the magnet tubes, as indicated in FIG. 4. Correspondingly, on rotation the induced voltage for a single S-ribbon changes sinusoidally as follows:

The width of the S-ribbon embedded in the current tube should preferably approximate the width of the zones, and thus in total cover about one half of the current tube circumference. Also, in order to prevent eddy currents in the ribbon when the current tube rotates, the ribbon should preferably be subdivided into mutually electrically insulated parallel strands that each are no wider than 1/16." In operation, beginning, say, with the axially oriented ribbon sections centered on the zones (of axial length L), a circumferential velocity $v_r$ will induce the voltage $V_1 = v_r LB$ in each of the ribbon sections but (essentially) none between zones. Thus if there are $N_z$ uniformly spaced zones and $N_z$ correlated ribbon sections, the maximum induced machine voltage will be $$V_{Mmax} = N_Z V_1 = N_Z v_r LB. \tag{3}$$

Further, if the zone width, i.e. the circumferential width of the magnets as projected on the current tube mid-line, is $L_m$, if the gaps between the zones are of the same width, and the current tube diameter is D, it will be $$N_z = \pi D/2L_m \tag{4}$$

i.e. with rotational velocity nu (v)

$$v = v_r/\pi D \tag{5}$$

for $$V_{Mmax} = \pi D v_r LB/2L_m = \pi^2 D^2 v LB/2L_m. \tag{6}$$

The axially oriented sections of the ribbon will in one current tube revolution traverse $N_z/2$ zones of same radial orientation of B, i.e. at current tube rotational velocity, v, at time intervals $$T=2/N_z v=2\pi D/N_z v_r. \quad (7)$$

Thus starting at t=0 with the S-ribbon sections centered on zones, the voltage between the ends of the S-ribbon will alternate as $$V_M = V_{Mmax} \cos(\pi N_z vt) = (\pi^2 D^2 vLB/2L_m)\cos(\cos(\pi N_z vt) = (\pi D v_r LB/2L_m)\cos(N_z v_r/Dt). \quad (8)$$

When the machine is operated as a generator at rotational speed v, external terminals contacting the two slip rings will therefore pick up an alternating (i.e. AC) voltage as in eq. 8, except for a factor $(1-\mathcal{L})$ wherein $\mathcal{L}$ is the machine loss composed of approximately 2% friction and windage, plus the Joule heat loss and (the generally negligible) electrical brush loss. Alternatively, an applied AC voltage, boosted by the factor $1/(1-\mathcal{L})$ will drive the same machine as a motor with rotational speed v.

The delivered electrical power, $W_M$, and conversely the delivered mechanical power in the motor mode, will be determined by the current flowing through the ribbon, $i_M$, as $$W_M = V_{Mmax} i_{Mmax}/2. \quad (9)$$

The current is principally limited by the ohmic loss in the ribbon via the machine efficiency in much the same way as it is in Multipolar and Multipolar Plus machines. The already obtained estimates as to power density of those machines, and in particular Multipolar Plus machines, are therefore applicable. Also the data on voltages and currents as a function of machine parameters are much the same as for MP Plus machines. In fact, since with stationary current tubes there are no brushes at all, MP-A and MP-T machines are liable to be the most favorable of all MP machines.

Construction of MP-T Machines

Advantageously, the S-ribbons will be composed of mutually insulated wires of no more than 1/16" diameter, so as to inhibit eddy currents. In a preferred configuration, those wires may be mildly twisted and compacted to approximate close-packing so as to achieve maximum possible current densities for optimal power density of the machines.

Changing the S-ribbon width within an otherwise unchanged machine, will change the wave form of an alternating current. Specifically, assuming uniform current density over the width of the ribbon, widening the S-ribbon beginning with a single strand that is much narrower than the zone width, will change the induced voltage from an abrupt on-off wave form with alternating "on" directions, over gradually less sharply defined transitions between "on" and "off," to sinusoidal when zone and ribbon width are equal. Further widening of the S-ribbon will cause decreasing voltage or torque amplitudes for motors and generators, respectively, and rising waste heat. This is so because leading and trailing edges of the individual ribbon segments will be increasingly exposed to opposite directions of B and thus opposite induced voltages or torques. Meanwhile, the total induced voltage or torque, being due to all strands in the ribbon, will rise with the width of the ribbon up to the point that it has the width of the zones. Thereafter the induced voltage and torque decrease, until almost all of the input energy is converted into waste heat, namely when the S-ribbon width becomes equal to the spacing between zones of same B orientation. From this analysis it follows that the optimal ribbon width will be near the zone width. Even so, as will be shown below, reducing S-ribbon widths in the current tube body to ⅔ of the zone width, permits making S-ribbons simply rectangled. A further simplification of current tube construction, especially in cases in which the current tube wall thickness is significantly smaller than the zone width, is possible by assembling S-ribbons from roughly equiaxed rectangled units.

The above proviso "assuming uniform current density over the width of the ribbon" touches on an important issue, since current uniformity is by no means assured, as follows: In a homogeneous conductive ribbon, the current density, and thereby the incremental contributions to the Lorentz force and machine torque, will be roughly uniform while the ribbon is centered on a zone. However, in general, only that ribbon part which is momentarily in a zone is subject to electromagnetic induction and the associated opposing induced voltage that is absent in the gap. Thus, for the moment contemplating the ideal case of B=0 in gaps between zones, the ribbon that is partly in a zone and partly in a gap essentially acts like two parallel conductors to which different voltages are applied, one in the gap and the other in the zone with net lowered voltage. At fixed total current through the ribbon, therefore, the current density will be considerably lowered in the zones, where the Lorentz force and induced voltage are generated, to disastrously reduce the machine torque at given machine current and speed, and similarly the current in the case of a generator. In fact, the magnitude of B varies almost sinusoidally along zones and gaps. The associated gradients of magnetic flux density, B, cause just the same effect, namely of current crowding in preference of areas of lower B.

For the case of S-ribbons with relatively fixed positions of the conductors in them, a solution to this problem is to alternate the positions of leading and trailing edges of the ribbon from one zone to the next so that the relative portions of ribbon width in zones and gaps are alternating and the above effect is eliminated over any even number of successive axial segments of S-ribbon. Fortuitously, such alternation between leading and trailing edges of the ribbon from one zone to the next will result automatically if at the turns between successive ribbon segments, the ribbon is rotated about an axis parallel to the current tube radius but not about its own axis, e.g. as suggested in FIGS. 3 and 4.

According to the present invention, another advantageous solution is to make S-ribbons in the form of slightly twisted wire bundles, e.g. of two to five full turns along the length of the current tube body in the space between the magnet tubes. In such a bundle, each wire will sample all values of the magnetic flux between its two ends. Thereby the current density in the bundle will become nearly uniform, independent of the S-ribbon position relative to the nearest zone center. Herein, for protection against eddy currents, the wire diameter should not exceed 1/16".

Machine Controls

As seen from eq. 8, the voltage of MP-A and MP-T machines is proportional to the rotation speed, —just as it is for MP and MP-Plus machines, but the frequency of the current or voltage, as the case may be, is also proportional to the rotation speed. Correspondingly, speed control of MP-A and MP-T machines is liable to be done through frequency control, via inverters, while as in all members of the family of MP machines, the current controls the torque. Machine control via inverters appears nowadays to be very prevalent for AC as well as 3-phase motors from low frequencies to hundreds of Hz. In case of an MP-A or MP-T machine with $N_z$ zones, in particular, an inverter with up to $v_v = 400 \text{ Hz} = 24,000$ rpm voltage/current frequency control could control up to a machine rotation frequency of $$v = v_s/N_z = 400/N_Z \tag{10}$$

according to eqs. 6 and 7. With a maximum of about $N_z=200$ for the largest machines, this example yields control up to $v=120$ rpm, which will be adequate for the largest machines.

Relative Merits of Brushed and Brushless Machines

The basic properties of MP-A machines outlined in the previous section, are independent of the choice between moving current tube or magnet tubes in accordance with FIGS. 2 and 3. In line with the preceding discussion, the consequences of this choice are important because of the relative advantage of brushless operation when the magnet tubes spin and the current tube is at rest, as illustrated in FIGS. 2B and 3B. Very important herein, and as already stressed, is the fact that with spinning current tube, each S-ribbon requires two brushes (or brush "sites") and two mutually insulated slip rings, i.e. altogether four brush sites and four slip rings for two S-ribbons, and six brush sites and six slip rings for three-phase machines with stationary magnets. Fortunately in this connection, unlike the cases of simple MP and of MP-Plus machines, in which the width of brushes is limited by the magnet width, in the present case the brush sites may be spread out over at least a substantial part of the rotating slip rings so that the slip rings do not need to be excessively wide in axial direction. Even so, on account of needed moisture access and cooling (see "Metal Fiber Brushes," D. Kuhlmann-Wilsdorf, Chapter 20 in "Electrical Contacts: Principles and Applications," Ed. p. G. Slade, Marcel Dekker, NY, 1999, pp. 943-1017) the brush length in sliding direction cannot be made arbitrarily long, and therefore in large machines, subdivision of brushes within any one brush site will typically be needed, which in turn requires the corresponding brush holders. In sum, therefore, the complication through six sets of electrical brushes and six slip rings for 3-phase power, MP-T machines with stationary magnet tubes, can be substantial to the point of perhaps making large three-phase machines with stationary magnets impractical.

The complication of rotating magnet tubes with their larger weight, as compared to lighter rotating current tubes, in regard to machine construction according to FIGS. 2B and 3B, appears to be rather more benign, or there may be none. In addition, machine weight and volume are beneficially impacted by the omission of slip rings and brushes. Therefore at this point the relative advantages and disadvantages of the two choices appear to be as follows:

Favorable Consequences of Spinning Magnet Tubes Versus Spinning Current Tubes

Elimination of brushes and slip rings will:
Modestly reduce machine length, volume and weight;
mildly decrease capital cost of machine;
reduce machine ownership cost by up to an estimated factor of two;
simplify machine cooling;
increase resistance against environmental damage;
with all components covered with protective coatings, increase ability to operate while immersed in water, up to perhaps sustained operation in sea water;
greatly increased possibility of multiple machine uses through generating sub-units in the current tube and connecting these to external components.

Unfavorable Consequences of Spinning Magnet Tubes Versus Spinning Current Tubes

Spinning of magnet tubes will:
at least double inertial forces and expected vibration and mechanical noise;
decrease lifetime of bearings which will partly offset the ownership cost reduction following from the elimination of electrical brushes and slip rings.

Neutral Consequences of Spinning Magnet Tubes Versus Spinning Current Tubes

Changing from spinning current tube to spinning magnet tubes is likely to have negligible effect on:
machine controls;
basic machine operation;
basic relationships among machine parameters;
machine efficiency.

The advantages for brushless MP-A machines increase with the number of S-ribbons involved, i.e. are especially strong for brushless MP-T machines, while the disadvantages are little dependent on the number of S-ribbons. Special emphasis herein may be given to the possibility of operating brushless MP-A and MP-T machines while fully immersed in water, even sea water that results from the fact that all parts of brushless MP-A and MP-T machines may, and in favored embodiments will be, completely protected with electrically insulating and chemically inert coatings, as was already stated in section "Basic Construction and Cooling of MP-A and MP-T Machines" above. For podded ship drives, use of MP-A and MP-T machines will be a great advantage indeed. Another question, further discussed below, is the power density of MP-T machines relative to simple MP and MP-Plus machines.

Geometry, Manufacture and Power Density of MP-A and MP-T Machines Fraction of Current Tube Cross Section that Carries Current with S-Ribbons In line with the above explanations and listing, MP-A and MP-T machines constructed in accordance with FIGS. 2B and 3B as compared to 2A and 3A or similar, are expected to have great advantages. In particular, the elimination of brushes and slip rings will shorten the machine and reduce its volume, and probably decrease construction cost and ownership costs, as further discussed below.

The construction of MP-A and MP-T machines is constrained by the expected need to assemble the machine from its parts and be amenable to disassembling and re-assembling for maintenance or repairs. Therefore, the current tube parts, dubbed "current tube rims," protruding beyond the magnet tubes (i.e. in FIG. 4A beyond the XX lines) should preferably have the same cross sectional dimensions as those inside (dubbed "current tube body"), and in any event should preferably not have a wider wall width and/or larger diameter than the current tube body, since this would interfere with sliding the current tube into and out of the machine. In accordance with FIG. 3, this restriction presents no difficulty for AC machines with just one S-ribbon in any one periodicity distance between zones, but is problematical for machines with multiple S-ribbons because of unavoidable crossovers of S-ribbons outside the magnet tubes to accomplish the connections between neighboring turns of the S-ribbons.

Figure 4D:
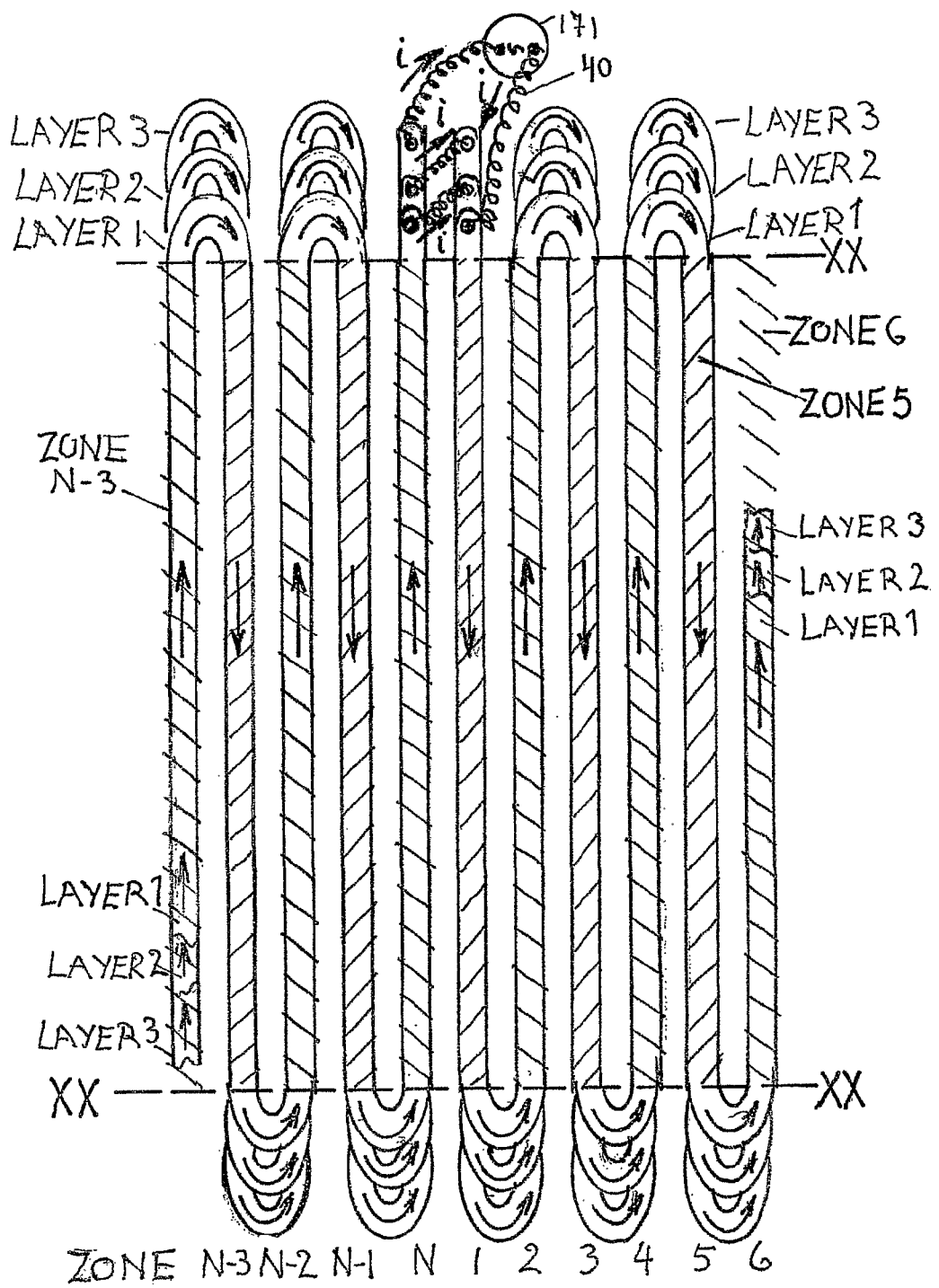

The case of three S-ribbons in any one periodicity distance, i.e. in particular MP-T machines with a single current tube, is of the greatest practical importance herein, and it suffices to consider it because larger numbers of S-ribbons per periodicity distance may be treated by means of current tubes constituted of two or more mechanically fused but electrically insulated current tube layers as clarified in FIG. 4D wherein the current tube comprises three layers and no division into sub-units is assumed. In that case at the moment that the alternating current makes the right terminal of current source 171 positive, the current enters the right terminal of layer 1, shown above line XX, and passes along the length of the current tube body, first at the momentary position of zone 1, turns through 360 below line XX at the bottom of the drawing, returns along zone 2 and so on, as indicated by the arrows, until it has passed zone N to reach the left terminal of current tube layer 1. From there the indicated cable connection leads the current to the right terminal of layer 2, in which layer the current again travels through all of the zones until it reaches the left terminal of layer 2. The indicated cable then leads the current to the right hand terminal of layer 3, for another circuit through zones 1 to N in layer 3 until the current emerges at the left terminal of layer 3 and from there through a cable connection to the power supply 171.

As will be noted, throughout the current will experience the same sense of Lorentz force, as in FIG. 4D it travels down when the shading slants from bottom left to top right, and travels up when the slant is from fop left to bottom right. In this manner, then, the current executes 3N "turns" in its travel between the two poles of power supply 171.

Since the current alternates, the current direction oscillates, and meanwhile the zones, being due to magnet poles affixed to rotating magnet tubes 5 and 6 will move horizontally in the orientation of FIG. 4D. The machine motor control will have to be arranged that is synchronizes these two effects, i.e. the alternating sense of magnetization due to the moving zones, and the alternating current direction on account of the alternating voltage direction supplied by the power source. For the sake of clarity, FIG. 4D shows only one S-ribbon per layer, i.e. the case of an MP-A machine, operated by simple AC power. The case of 3-phase is directly derivable from FIG. 4D by using three S-ribbons as in FIGS. 4A and 5.

Except for FIG. 4D, already discussed, the case of three S-ribbons per current tube in an MP-T machine is considered in FIGS. 4A to C and 5. These demonstrate by means of FIG. 4B that the most simple case will require a current tube wall width of at least three S-Ribbon thicknesses in the current tube body, but that by mechanical compaction as in FIG. 4C this can be reduced to two S-ribbon thicknesses.

Rearrangement, e.g. as in FIG. 5B, including paralleogrammatic slabs and into simple rectangled bars as in FIG. 5E, can increase the volume occupancy of conductors in the current tube cross section above $\frac{5}{6}^{th}$=83% in FIG. 4B, namely to near full occupancy, assuming near close packing of the individual S-ribbon through compacting. In any event, there will have to be a minor percentage of insulating material within S-ribbons for the suppression of eddy currents, as well as between S-ribbons a, b, and c (labeling these according to their relative positions), and on the outer and inner current tube surfaces. Together these non-conducting components will reduce actual volume occupancy of conductors in the current tube body to about 94% at the most.

Also the current tube rims protruding beyond the magnet tubes can be reduced to two S-ribbon thicknesses, indeed more easily than the current tube body. This is demonstrated in FIG. 4A, wherein local three-layer thickness areas that would result from 180° turns in the form of circular annular rings, are avoided through narrowing the S-ribbons near their apex. Accordingly, at constant external current tube rim wall thickness, the thickness of the conductors in current tube rims may be approximately doubled where there is only one layer, e.g. in particular the outermost pieces that comprise holes 177. Doing this will at the same time mildly increase weight, decrease electrical resistance, and improve the stability and serviceability of insulating screw-in plugs 178 and terminals 176.

Possible Practical Design and Manufacture of MP-T Machines

Figure 5:
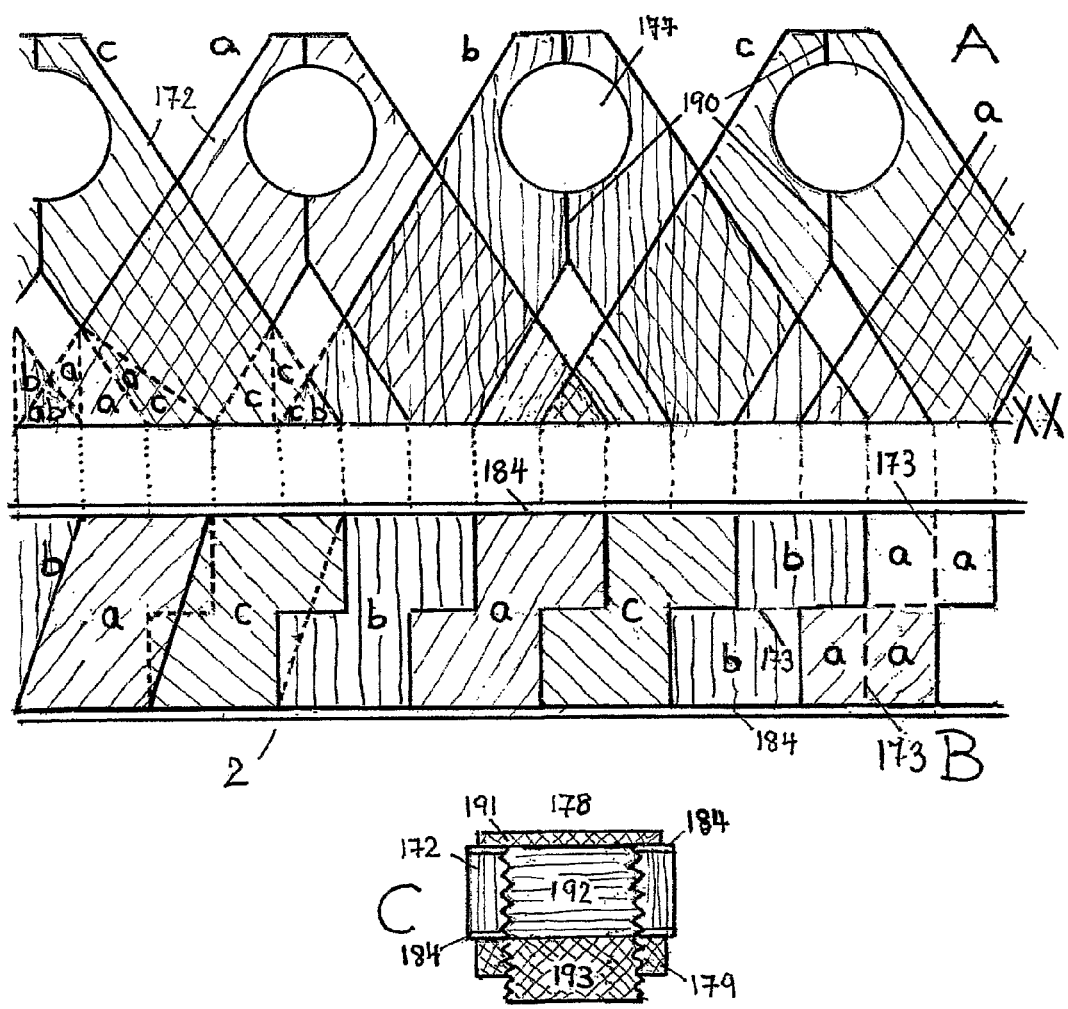
FIG. 5A shows mutually insulated adjoining parts of S-ribbons in the current tube rim, i.e. above or below the XX lines in FIG. 4A, including round holes for the insertion of plugs.
FIG. 5B shows possible S-ribbon arrangements in the cross section of the current tube body and relates them to S-ribbon positions in the current tube rim.
FIG. 5C shows the cross section of a screw-in plug for one of the round holes in FIG. 5A that will establish electrical connection between adjoining sides of S-ribbons.
FIGS. 5D and 5E are similar to FIGS. 5A and 5B but show a still more simplified and presumably more cost-effective construction.
FIG. 5F shows a plan view of part of a current tube with S-ribbon parts in the rims constructed as in FIG. 5D but, at lines XX, with mildly twisted wire bundles feeding from the current tube body into each side of the S-ribbon parts in the rims.

FIG. 5 presents a modification of FIG. 4. Herein, the compaction of three similar S-ribbon sets, again labeled a, b and c according to their relative position, into a two-layer thickness (plus insulating joints between the ribbons and insulating surface layers 184 on the current tube) is made simpler and more efficient in FIGS. 5B and 5E compared to FIGS. 4B and 4C. Also, the "current tube rims" beyond lines XX in FIGS. 4 and 5 are redesigned. Namely, as shown in FIG. 5A, the upper current tube rim, shown in relation to the current tube body in FIG. 5B, involves zero, one and two layers of S-ribbons, whereof one-layer thicknesses are in preponderance. As already stated, in preferred embodiments the metal thickness in those one-layer areas will be doubled, such as to make the current tube rim wall thickness equal to the compacted wall thickness of the current tube body. Also the cross sectional arrangement of the layers at the joint line needs to be adjusted to permit optional butt-joining of current tube rim and current tube body along line XX. Specifically, in FIG. 5, in which the circumferential width of the S-ribbons as equal to the zone width is retained in the current tube body, this is done through thickness beveling as indicated by the dotted lines at lower left of FIG. 5A. Herein S-Ribbon cross sections in the current tube body are parallelogrammatic as at left in FIG. 5B.

Figure 5F:
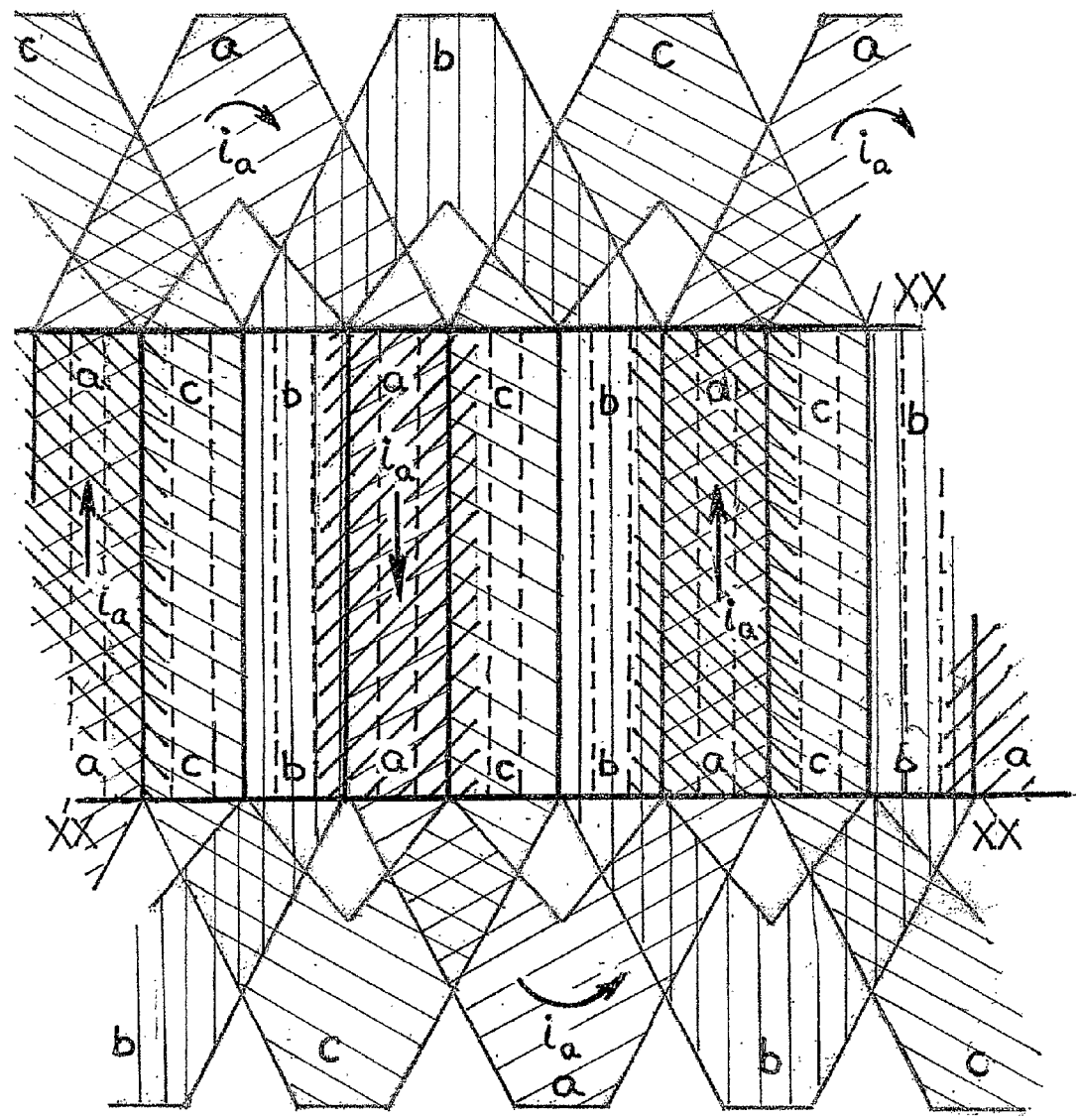

By decreasing the S-ribbon width in the current tube body to $\frac{2}{3}$ of the zone width, and correspondingly adjusting the shapes of the S-ribbons in the current tube rim according to FIGS. 5D and 5F, S-ribbons in the current tube may be made rectangled as in FIGS. 5E and 5F. This will simplify current tube construction.

In either case, according to the present invention, S-ribbon parts in the current tube body may advantageously be made in the form of mildly twisted compacted bundles of mutually insulated wires of no more than $\frac{1}{16}''$ diameter so as to inhibit eddy currents. A particular advantage of mildly twisted wire bundles has already been outlined above. It is that the wires in them will sample the magnetic flux density within the whole S-ribbon width and thereby eliminate periodic shifting of currents from regions of higher magnet flux density, i.e. at the zone centers, to regions of lower flux towards the zone edges or even beyond. Thereby wire bundles are expected to decrease electronic noise. Further, the discussed current shifting in S-ribbons will mildly lower the value of B in the current path and thus impair machine power density. Additionally, according to the present invention, mildly twisted and compacted wire bundles are expected to significantly lower current tube construction costs because they reduce the number of, and are much stiffer than, the items to be assembled into a current tube, namely $\leq\frac{1}{16}''$ wires or bars.

For further clarification of the geometry involved, the momentary location of the zones, namely at the moment of symmetric positioning relative to the S-ribbons, are shown by means of horizontal shading in FIG. 5E and by diagonal shading in FIG. 5F.

FIGS. 5A and 5C as well as FIG. 6 indicate means for dividing machines into sub-units that may be employed in independent machine functions, namely via holes 177 and exchangeable plugs 178, 195 and 196 in FIGS. 5C and 6 that are further discussed below. No division of the current tube into sub-units is envisioned in FIGS. 5D and F. Therefore no holes and plugs are shown in FIGS. 5D and 5F, but these features could be readily added. Also insulating barriers 190 as in FIG. 5A are required to prevent short circuiting between connections to different outside connections, i.e. at the "in" and "out" terminals of sub-units. In machines without sub-units, barriers 190 are only required at the "in" and "out" machine terminals, as shown in FIG. 5D for the electrical connections to an external 3-phase power source (not shown). FIG. 5D shows the "in" and "out" terminals separated by an extra three S-ribbons in the rim so as to greatly reduce the danger of short-circuiting. This would be an extra precaution that is strictly optional.

Thicker solid rim edges will be useful in fitting the current tube rim with electrical connections. Thereby, optionally, a multiplicity and up to all S-ribbon "turns" are prepared for electrically connecting to outside components such as power supplies and power consumers, i.e. for dividing the machine into sub-units for multiple machine uses.

Most simply, the ribbons inside of the current tube body as well as in the current tube rims could be made in one continuous length, of parallel, axially extended elements (e.g. "wires" or "rods") whose width in circumferential direction would be, say, $\frac{1}{16}$" or less in order to suppress eddy currents, as already indicated above. However, in accordance with the present invention, and as implied in FIGS. 4, 5 and 6, favorably current tubes will be made in three sections, namely a current tube body (inside the XX lines in FIGS. 4 and 5), and two current tube rims, one each on either side of the XX lines indicated in FIGS. 4A and 5A. These would be conductively butt-joined by means of soldering, conductive glue or any other suitable method. Further, in preferred embodiments, comprising sub-units that may be used largely independently of each other, e.g. as motor(s), generator(s) and/or parts of transformers, S-ribbon pieces in the current tube rims may (i) be made of solid metal and (ii) provided with insulating barriers 190 to electrically separating sub-units, and (iii) holes 177 or slots (not necessarily round as in FIG. 5A or oval as in FIG. 6A) that may be fitted with releasable "screw-in" plugs (178 in FIG. 5) or "drop-in plugs (195 and 196 in FIG. 6) to make electrical connections between successive "turns" and/or to outside components such as power sources or receivers, as may be desired.

In butt-joining current tube bodies and current tube rims, care should be taken to minimize unintended electrical connections between different elements since such degrade machine efficiency. Preferably, every a S-ribbon part in a current tube rim should be joined to its corresponding a S-ribbon part in the current tube body, across the conductive joints, without generating inadvertent electrical connections between the a S-ribbon and b or c S-ribbon parts. Similarly every b and c S-ribbon part should preferably be conductively joined across the conductive joints to its corresponding b and c S-ribbon part, without generating inadvertent electrical connections to other parts. As an aid to this end, according to the present invention, prior to soldering or conductively gluing together a current tube body and current tube rim, matching shallow grooves, e.g. of one to a few millimeter depth and of less than $\frac{1}{8}$"≈3 mm width, may be engraved on both sides, and said shallow grooves may be filled in with insulating material.

In preferred embodiments, and as indicated in FIG. 5F, a plurality of neighboring, mechanically joined but electrically insulated twisted and compacted wire bundles in a current tube body may be electrically conductively joined to a solid corresponding part in a current tube rim. In FIG. 5F, three wire bundles each are so assembled as indicated. The advantage of doing so is as follows: Advantageously, twisted compacted wire bundles will be roughly equiaxed, and also advantageously, one dimension of such wire bundles will correspond to the width of the current tube body wall thickness, as indicated in FIGS. 4 and 5. This parameter is favorably determined from considerations of overall machine construction, and different considerations will be used to determine the current tube diameter, number of zones, zone width and the width of the S-ribbon parts in the current tube rim. Discrepancies in the so determined optimum desired values of the different parts may be more readily reconciled by the indicated assembly of a multiplicity of twisted wire bundles into one S-ribbon width in a current tube body.

Note also in FIGS. 4A and 5A that, in preferred embodiments, the width of the rims is only about $2L_m$, i.e. about twice the zone width and, typically, in the order of twice the current tube wall width, for a total machine length of $$L_m = L + 4L_m \quad (12)$$

with L the length of the magnet tubes. Under almost all circumstances this will be significantly shorter than achievable with any brushed MP machines with their associated slip rings, including also MP-Plus machines.

The indicated simplified construction of current tube rims incorporating solid metal, instead of laminated or otherwise subdivided, S-ribbon sections, e.g. shaped as in FIG. 4A or 5A or similar, is possible because there is no need for eddy current barriers outside of the magnetic flux of zones. However, in simply butt-joining the a-, and similarly b- and c-parts of S-ribbons of current tube body and current tube rims, the previously discussed feature of reversal of leading and trailing edges of S-ribbons in successive zones, in order to prevent crowding of current into areas of low magnetic flux, is lost. Thereby a significant fraction of the machine torque could be lost, as the solid parts in the current tube rims would permit current transfer between ribbon parts within and outside of zones.

According to the present invention this problem is avoided by making a, b and c S-ribbon sections in the current tube body from bundles of mutually electrically insulated $<\sim\frac{1}{16}$" diameter wires that are lightly twisted and compacted, extruded or rolled into the shapes of a, b and c S-ribbons (the same if the configuration of FIG. 5B is chosen). Compaction or rolling as for FIGS. 4B and 5B will be facilitated if the wires are smooth, round and glued together with a thin layer of insulating adhesive that softens above machine use temperature, e.g. above 100° C., and the bundles are shaped while heated to a temperature at which the adhesive is suitably softened. For the purpose of avoiding the discussed shifting of current from zones into gaps between zones, the bundles should have at least one full twist in length L of the magnet tubes, or arbitrarily more twist, since this will equalize the impedance (effective resistance) over the S-ribbon cross section.

Since by their nature, the cross sections of twisted bundles of fibers tend to be equiaxed, compacting these into the elongated cross sections of the a and c S-ribbons in FIG. 4C, and the stepped cross sections in FIGS. 4C and 5B, may pose a problem. If so, and in any event if for some reason this should be advantageous, the S-ribbons may be constructed from more nearly equiaxed rectangular cross sections that are fitted together with conductive adhesive, as for example indicated by dotted lines at the right side of FIG. 5B. Most simple may be the parallelogrammatic shapes at FIG. 5B left.

The machine use temperature may be limited by the softening temperature of the adhesive in the S-ribbons. However, the use temperature of MP-machines of all types is anyway restricted to the temperature beyond which the magnetization of the permanent magnets degrades. Hence, according to the present invention, the softening temperature of the adhesive in the S-ribbons, as well as of the adhesive bonding within S-units and into a current tube body, and also of the matrix and/or surface cover material of current tube bodies and current tube rims, do not need to be much higher than the expected use temperatures of the MP-A and MP-T machines at issue, and below the temperature at which the permanent magnets degrade.

Different Machine Functions Via Sub-Units, Alternatively and/or Simultaneously

Up to now, S-ribbons were considered to pass once through all zones about the current tube, and start and end in close proximity, e.g. in neighboring zones, as in FIGS. 3A and 3B. This is an unnecessary restriction. Rather, in general, a single S-ribbon may encircle a current tube n times with n any number smaller or larger than unity, and conversely a multiplicity of S-ribbons may be contained in a single current tube, i.e. essentially a single circuit of an S-ribbon about a current tube may be broken up into any desired number of sections. Also, multiple mutually isolated S-ribbons may be placed on top of each other in a current tube, as in FIG. 4D. Similarly the start and end of two S-ribbons may be placed into neighboring zones, or into any desired positions.

Importantly, any continuous part of S-ribbon, through which a current may pass independent of other continuous parts of S-ribbon, constitutes a "sub-unit" that may be used like an individual motor, generator or transformer winding whose current may be individually controlled and whose voltage is proportional to the number of passages along separate zones comprised in that sub-unit. This concept for which patent protection has previously been claimed for MP machines (ref. 1) and for MP-Plus machines (ref 2) applies also to MP-A and MP-T machines in accordance with the present invention.

Figure 6:
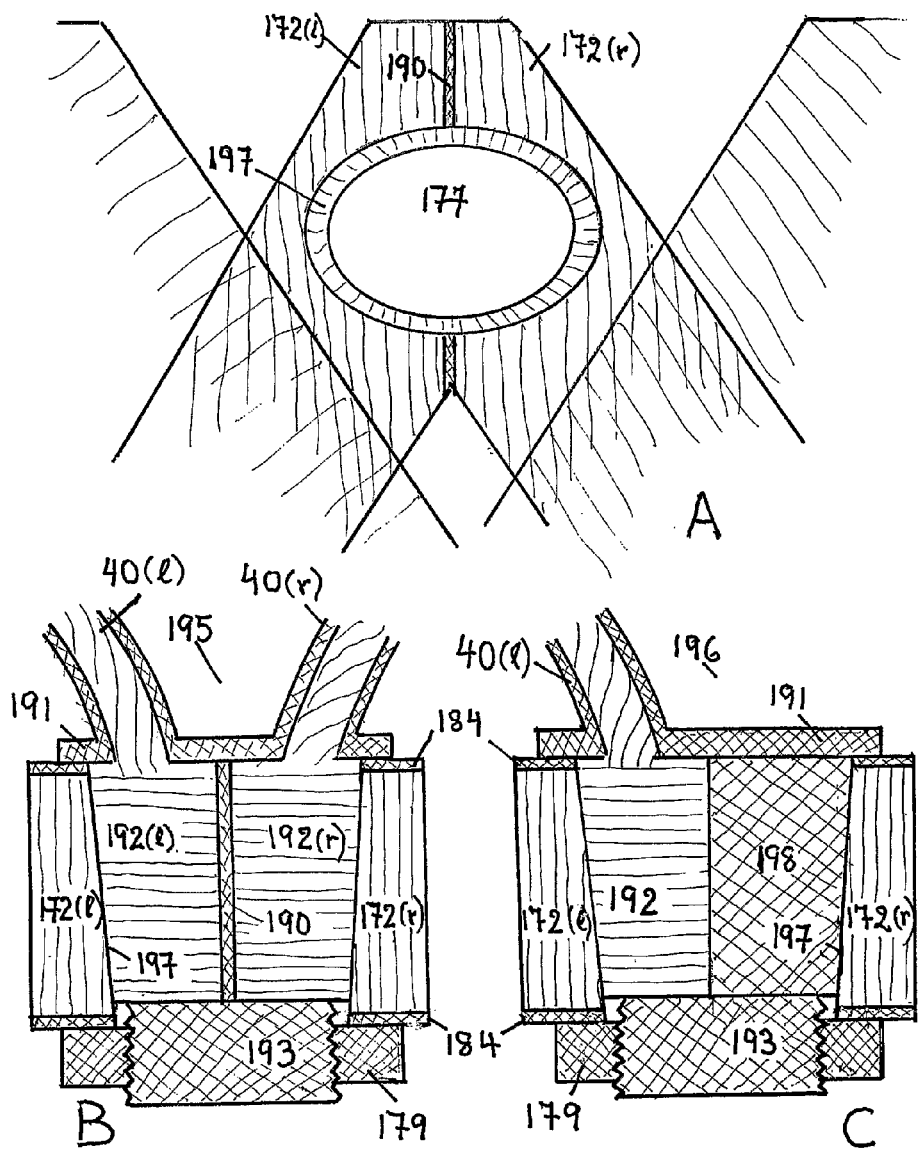
FIG. 6A as FIG. 5A but enlarged and with an oval instead of a round hole.
FIG. 6B shows a cross section of a "drop-in plug" for making independent electrical connections between the outside and adjoining parts of an S-ribbon.
FIG. 6C shows a cross section of a "drop-in plug" for making an electrical connection between the outside and the left part, but not the right part of an S-ribbon.

Insulating barriers 190 in FIGS. 5 and 6 are the means by which the end-points of sub-units are established optionally, at one extreme, at every S-ribbon on both current tube rims, as shown for one rim in FIGS. 5 and 6, and on the other extreme at only one current tube rim and only one location about the current tube circumference. The latter is the case in FIGS. 3A and 3B, wherein the interruption in the S-ribbon is morphologically, but not functionally, different from a barrier in the shape of 190 in FIGS. 5 and 6. According to the present invention, one may therefore choose to separate any one S-ribbon into as many sub-units as the number of zones traversed by it when Lorentz forces are generated, namely by providing barriers 190 at each end of each zone. However, since in brushed machines as in FIG. 3A, use of any one sub-unit constituted by an S-ribbon section requires two brushes and two slip rings, more than, say, two sub-units will be practicable only in brushless machines, i.e. as in FIG. 3B, with every sub-unit connected between two terminals (176) and no terminal connected to more than two sub-units.

FIGS. 5 and 6 illustrate a simple method for providing terminals equivalent to 176 in FIG. 3B. Herein, for clarity, metal parts are given with shadings of smooth parallel lines and insulators are cross-hatched.

As a first step, FIG. 5C shows a "screw-in" plug that will establish a permanent low-resistance electrical connection between S-ribbon parts 172(l) and 172(r) that had been isolated by barrier 190. Plugs with conductive bodies such as 178 make electrical contact with the respective S-ribbon parts about their whole circumference and thus establish electrical connection between S-ribbon parts 192(l) and 192(r), thereby disabling, temporarily or permanently, any separation of an S-ribbon into adjoining sub-units. Further, modifications of plugs may be used to establish connections of S-ribbon ports to outside electrical components.

The advantages of screw-in types of plugs like 178 include great geometrical simplicity, low boundary resistance between the two S-ribbon parts, and firm permanent installation by means of nut 179 on insulated threaded end 193, optionally supplemented by a lock-nut washer or other means to prevent nut 179 from loosening during use. However, they do not establish a correlation of contacts between plug and left versus right side, top and bottom. Also, if cables to the outside should be attached to screw-in plugs they will tend to become twisted during installation and removal.

Therefore, as a second step, the shape of hole 177 is changed to tapered oval in FIG. 6A AND "screw-in plug" 178 is replaced by "drop-in" plugs 195 or 196 or variations thereof. Retaining insulated threaded end 193 and nut 179 in conjunction with the tapering assures low contact resistance also without a screw thread as in plug 178. Specifically, plugs 195 and 196 in FIGS. 6B and C illustrate convenient ways of making connections to other sub-units in the same machine and/or to outside components such as power sources, motors and generators. In the case of plug 196 (FIG. 6C), electrical connection is made via insulated cable 40(l) from/to only one of the S-ribbon sides, in this case 192(l), while plug 195 of FIG. 6B makes independent connection via cables 40(l) and 40(r) from/to both sides, i.e. 192(l) and 192(r).

In FIG. 6A, the shape of hole 177, i.e. oval in this case, is arbitrary. Any other shape such as polygonal or slot-like, or a combination of straight and rounded parts of the periphery may be chosen. The salient feature is departure from rotational symmetry compared to hole 177 and plug 178 in FIG. 5C. In practice, choices as to the morphology of hole 177 will be made based on additional considerations such as cost; ease of installation, replacement and interchanges, perhaps while the machine is in operation; minimization of possible errors in installation, replacement and interchanges; and magnitude of internal resistance.

The drop-in nature of plugs 195 and 196 of FIG. 6 avoids tangling and in general sterical interference with and among cables. Cables are depicted as insulated. Such insulation is virtually automatic in line with electrical engineering practice, but in this case has the particular feature of being fused with the material of insulating cap 191 that is sealed against the outside insulating coatings 184 of ribbon parts 172 and barrier 190. This fusing or tight joining is essential for effective sealing against ambient fluids and therefore long-term serviceability of machines, especially in hostile environments, e.g. when fully immersed in sea water or perhaps operating as a pump (e.g. FIGS. 7 and 8), perhaps in chemical plants. For the same reason, i.e. effective sealing against ambient fluids, the contact surfaces of cap 191 and washer 179 will advantageously be lined with a suitable elastomer, e.g. Viton®.

The use of sub-units has previously been discussed in fair detail, namely in refs. 1 and 2. For the present application a brief outline may therefore be sufficient: Every sub-unit will deliver as a generator, or will use as a motor, a voltage in accordance with the number of zones traversed by its current. Namely, the induced voltage between the ends of an S-ribbon section in a current tube with magnet length L that extends over $N_{ZS}$ zones of magnetic flux density of B and spins with surface velocity $v_r$ will be $$V_S = N_{ZS} v_r BL = N_{ZS} v \pi DBL.$$

Any particular S-ribbon under consideration, will be essentially independent of any other sub-units, except that, normally, the values of B, L, D and certainly v will be the same in all sub-units of a machine. Therefore the voltage applied to, or delivered by, different sub-units of a machine will be proportional to $N_{ZS}$, i.e. the number of zones over which any particular sub-unit extends. Thus it will be possible to drive a certain motor from two or more different voltage sources with different voltages at a fixed speed. This could be useful in order to, say, bolster the machine power at constant speed, i.e. in a variant of "field weakening."

In the multiple use of sub-units, care may have to be taken not to unbalance current tubes through non-uniform currents in different sub-units that will cause the corresponding different forces and stresses about the circumference of a current tube. For this purpose, encirclements by whole numbers of S-ribbon may be best, especially at low rotation speeds. Or one may for example use three consecutive S-ribbons each one third current tube circumference long. Or use five consecutive S-ribbons that total two current tube circumferences in length, all with the same current. Or use, say, three pairs of two similar S-ribbons each, distributed over one circumference. For example the two S-ribbons of one pair could span 45° each, another pair could span 60° each, and a third pair could span 30° each for a total of 2×(45°+60°+30°=270°, leaving 90° of current tube circumference free of S-ribbons. Herein, the S-ribbons as well as the free spaces between them will preferably be pair-wise distributed diametrically across each other so as to nearly equalize forces and stresses about the current tube and magnet tubes.

Again, with the envisaged mutual electrical insulation among the ribbons and their respective pairs of terminals (176*n* according to FIG. 3B) each of these S-ribbons would function like an independent motor or generator. Therefore they may be connected to independent sources or supply independent power to consumers, PROVIDED that all S-ribbons that operate in the motor mode are supplied with the same frequency AND are at same phase in the case of AC or have the appropriate phase in the case of three-phase current. Thus one large machine may simultaneously drive a ship propeller, as generator could provide different voltages to different circuits, and supply electricity to heaters. This same concept of simultaneous multiple uses has previously been proposed for simple homopolar MP machines as also for MP-Plus machines with so-called "radial zig-zags," see ref. 2. Albeit in both cases a large number of brushes and brush holders would be required.

As an example for the application of independent sub-units, that was already given in ref. 2, consider a large 1440 Volt MP-A ship drive machine comprising, say, 144 zones, in which 1200 volts, i.e. 120 zones, are dedicated to turn a variable pitch propeller at a constant 100 rpm speed but with widely variable torque supplied through a controlled current. Of the remaining 24 zones, 22 could be devoted to supplying 220 V alternating current for hotel uses of the ship and the last two zones for supplying 20 Volt AC emergency circuits, —which could well be rectified into DC. This would make it possible, also, to idle the propeller while in harbor but still supply the other needs, or in case of urgent need, e.g. as for a war ship avoiding a submarine threat, to divert all of the power to the propeller and perhaps to drive it faster by connecting the 120 zones and the 20 zones in series. Or conversely to increase the "hotel" power at the expense of propeller power, or to extract extra power for cannons or catapults. In fact uses of independent sub-units are almost without limit.

More mundanely, for only a single mode of use, or perhaps a few such as for "field weakening," the opportunity to let S-ribbons extend over any desired number of "turns," i.e. pass through an arbitrary number of zones, permits great flexibility in the design of MP-A and MP-T machines to user specifications as to desired rotation speed, voltage and current. This may be done through selectively connecting the input or output of different S-ribbons in series or in parallel, as may be desired, —optionally switching while the machine is in motion since the terminals 176 are permanently at rest.

Expected Machine Efficiency and Power Density of MP-A and MP-T Machines.

The very favorable machine efficiencies and power densities of MP and MP-Plus machines carry over to MP-A and MP-T machines without any adjustments except for the changes caused by the different current tube design and changed power sources, i.e. from DC to AC and 3-phase, —besides the elimination of brushes.

(i) Given that the peak current as well as voltage in AC are $\sqrt{2}$ larger than in DC for same power and torque in DC and AC, there should be no efficiency difference on account of DC versus AC and 3-phase per se.

(ii) In regard to current tube construction note that for 1-S-ribbon MP-A machines only one half of the current tube body is occupied by conductors, while the rearranged and compacted S-ribbons of MP-T machines (as in either shapes of FIG. 5B or any other) and of AC machines with two S-ribbons may occupy all of the current tube body, i.e. except for surface and internal insulation layers. This is much the same as the ~94% current tube occupancy by conductors in the current tubes of MP and MP-Plus machines. In the former, operation with DC provides for continuous current in the zones, accounting for about 50% of the current tube volume, together giving rise to ~½× 94%=47% average "current tube utilization." Similarly, at any moment, only about 50% of the current tube body of MP-T machines is in zones, for the same ~½×94%=47% current utilization. There is, then, no significant difference in regard to current tube body conductivity between MP and MP-Plus machines over MP-T machines. However, MP-A machines with just one S-ribbon have a current tube utilization of only about 25%.

(iii) Brushless MP-A and MP-T machines have an advantage over MP and MP-Plus machines through being somewhat shorter. Their two rims add only in the order of $4L_m$ to the machine length which will be generally less than the width of slip rings. Previously compiled tables covering a large range of MP-Plus machine sizes and speeds, indicate that for otherwise same construction, the attendant change of current tube lengths from substitution of slip rings for current tube rims will be in the order of 10%. Also, the elimination of brush electrical resistance and friction is an advantage of brushless MP-A and MP-T machines that can significantly reduce machine losses. More importantly yet, the extra capital investment and ownership costs of slip rings and electrical brushes weigh against MP and MP-Plus machines.

On balance, there is thus an expected modest advantage in power to weight ratio of brushless MP-T and 2-ribbon MP-A machines over MP-Plus machines. This advantage is independent of expected improvements of power density for all MP machines through optimizing magnet arrangements over Hallbach arrays exclusively considered up to now. Also, brushless MP-A and MP-T machines according to the present invention are expected to have lower capital and ownership costs.

Inertial Forces and Maximum Speeds of MP-A and MP-T Machines

The inertial forces on bearings 35 and machine axle 10, due to moving magnet tubes 5 and 6, as compared to moving current tube 2, are approximately proportional to the rotating masses. Very roughly, the masses of the three tubes at issue are similar, and thus the inertial forces and resulting stresses are roughly twice as large with moving magnet tubes than with moving current tube. This difference will affect especially the life times of low-friction bearings 35 in FIGS. 2 and 3.

The speed of simple MP and MP-Plus machines is limited by the maximum brush sliding speed. Typically, on a sustained basis, this is about 40 m/sec and could perhaps be as high as 60 m/sec. By contrast, the speed of brushless MP-A and MP-T machines is limited by the hoop stresses in the magnet tubes that result from the centrifugal forces of the rotating mass, i.e. magnets, flux return and structural material. The simple derivation below shows the resulting maximum rotation speeds of brushless MP-A and MP-T machines to be moderately higher than that due to brush sliding speeds, as follows.

Let the diameter and average wall thickness of a magnet tube under consideration be D and H, respectively. Further, let the minimum wall thickness of the tube, where the tensile stress on account of the centrifugal force is largest, e.g. midway between two neighboring magnets, be FH, with F equal to, say, F=½ on account of cooling channels; and let the average mechanical density of the tube material be d=7,500 kg/m$^3$, appropriate to high-grade permanent magnets and iron flux returns that also serve as the tube matrix material.

Then the most highly tensile-stressed cross sectional area of the magnet tube, that is most likely to fail, is $$A_C = FH(L + 4L_m). \tag{13}$$

Together with the correlated cross section on the opposite side of the tube 180° away, i.e. cross sectional area $2A_C$, must support the component of the centrifugal force $(mv^2/r)$ of one half of the magnet tube mass that is normal to them, the centrifugal force of the other half representing the reaction force.

In our case r=D/2, and v is the circumferential speed $v_r$, i.e. $v = v_r = \pi D \nu$ according to equation 5, with $\nu$ the rotational frequency of the machine. Further, in view of the fact that typically $L_m \ll L$, the two-part tensile-stressed cross section is $$2A_C \approx 2FHL \tag{14}$$

the mass subject to the centrifugal force is $$m \approx \tfrac{1}{2} d\pi DHL \tag{15}$$

and the normal component of the centrifugal force per unit length acting on $2A_C$ is $$F_C = dDHv_r^2 L/(D/2) = 2dHv_r^2 L. \tag{16}$$

Thus the resulting tensile stress on the cross sections most likely to fail is $$\sigma_c = F_C/2A_C = dHv_r^2/FH = (d/F)v_r^2. \tag{17}$$

Numerically, with F=½ and d=7500 kg/m$^3$, using the mks system throughout, this yields $$\sigma_c = 15{,}000 v_r^2 \text{ [mks]} \tag{18}$$

or $$\sigma_c = 15{,}000 \pi^2 D^2 \nu^2 \text{ [mks]}. \tag{19}$$

A typical safe value for the tensile stress of the magnet tube material is expected to be $\sigma_{c\,max} = 10^8$ N/m$^2$=100 MPa≅10 kgwt/mm$^2$ If so, the maximum safe speed of MP-A and MP-T machines in terms of surface velocity and rotation frequency is $$v_{r\,max} \approx (10^8/15{,}000)^{1/2} \text{ [mks]} = 82 \text{ m/sec} \tag{20}$$

and $$\nu_{r\,max} \approx (10^8/148{,}000)^{1/2}/D \text{ [mks]} = 26 \text{ [m/sec]}/D. \tag{21}$$

Thus, centrifugal forces acting on rotating magnet tubes permit higher surface speeds, namely $v_{r\,max} \approx 82$ m/sec, and correspondingly higher rotational frequencies of MP-A and MP-T machines, than do electrical brushes sliding on slip rings. For example, the smallest MP-T or MP-A machines with, say, D=0.1 m current tube diameter, could operate up to 260 Hz=15,600 RPM and the largest with, say, D=3 m could be run up to 8.7 Hz=520 RPM. In this respect, then, MP-A and MP-T machines are superior to MP and MP-Plus machines.

Meanwhile, however, at top rotational speed, the current frequency would be $$\nu_\nu = N_Z \nu_{r\,max}. \tag{22}$$

It therefore depends on $N_Z$, the number of zones per current tube, whether machine controls based on inverters, discussed in the section Machine Controls, will be adequate. If the limit should be $\nu_\nu = 400$ Hz, as suggested in that section, then the mechanically allowed top speed would according to eqs. 21 and 22 restrict $N_Z$ to $$N_{Z\,max,\,\nu r\,max} = (400/26)D = 16D \tag{23}$$

with D in meters. Hence it is well possible that machine controls limit the rotation speed rather than mechanical strength of magnet tubes.

MP-A and MP-T Machines with Flared Current Tubes and/or without Central Axle

Figure 7:
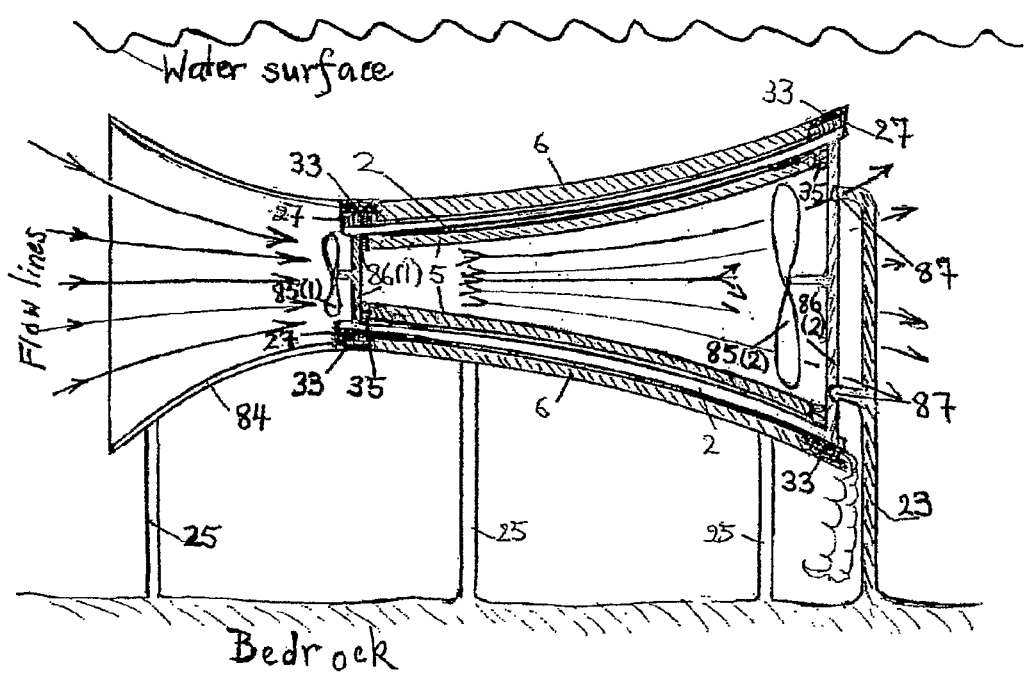
FIG. 7 shows a cross section of an MP, MP-Plus, MP-A or MP-T machine with stationary magnet tubes, flared current tube, inside propeller and no central axle, for pumping fluid.
Figure 8:
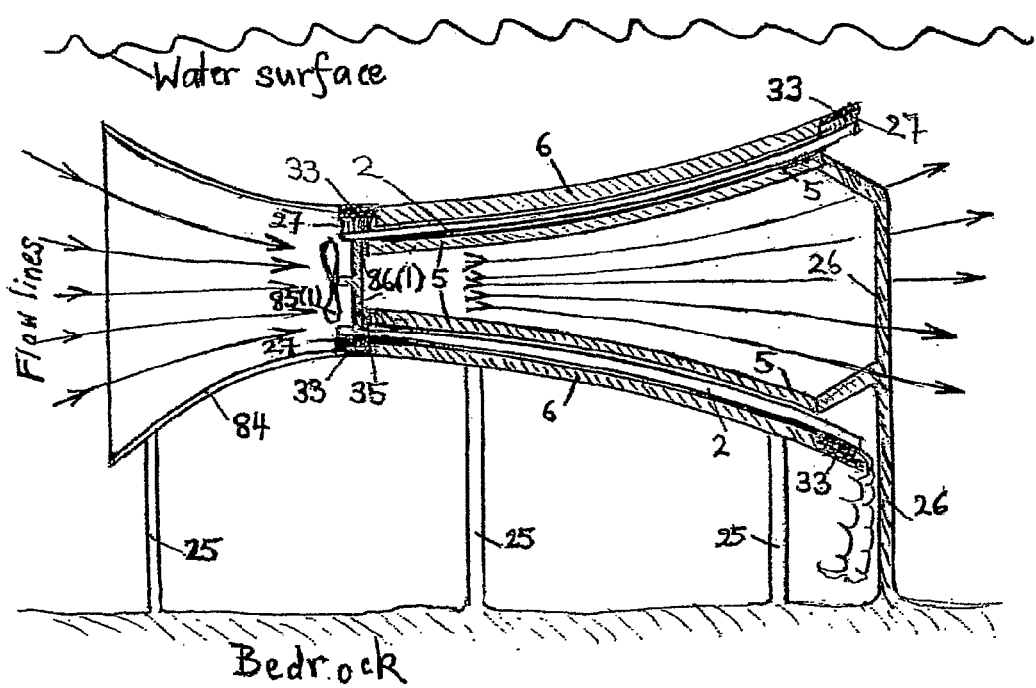
FIG. 8 is the same as FIG. 7 but with a different propeller arrangement.
Figure 9:
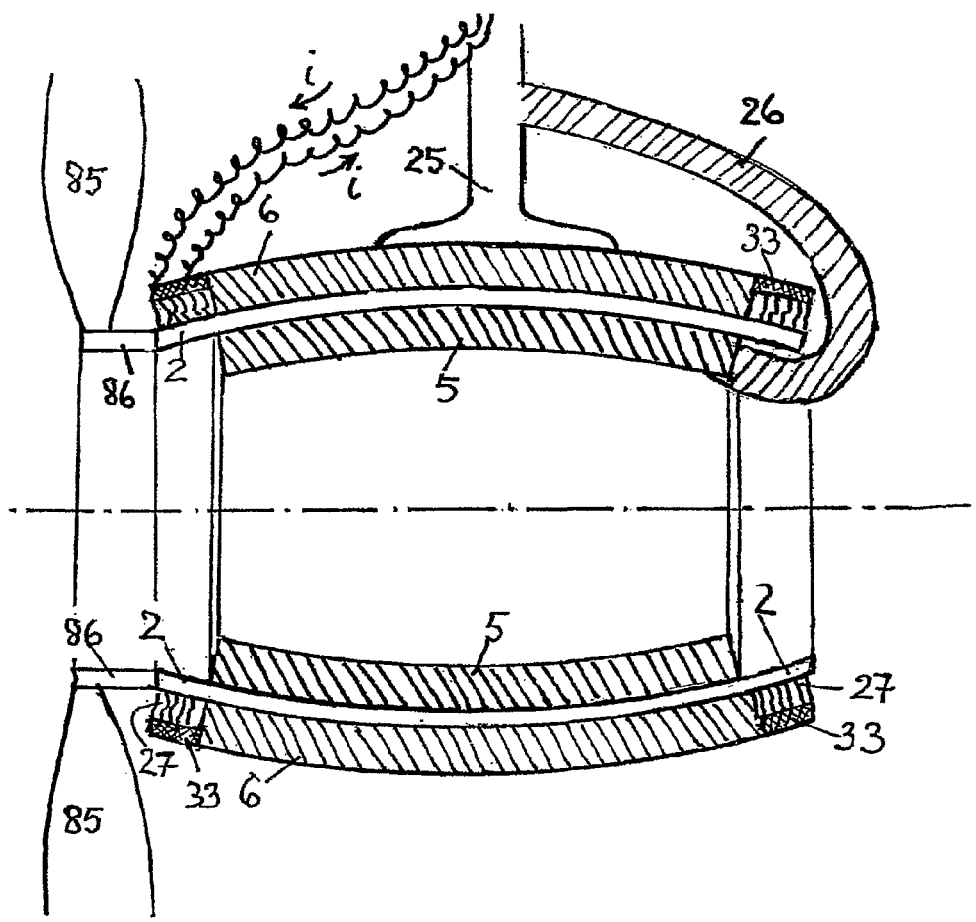
FIG. 9 as FIG. 7 but with barrel-shaped current tube and with outside propeller.

FIGS. 7, 8 and 9, which reproduce FIGS. 20, 21 and 22 of ref. 2, respectively, demonstrate that central axle 10 may be omitted, e.g. to lighten machines, to make them less expensive and/or to clear the machine interior for fluid flow-through, e.g. as would be particularly appropriate when MP machines are fitted with inside propellers or impellers 85. FIGS. 7 to 9 also demonstrate that MP current tubes need not be simply cylindrical with constant current tube diameter but may comprise any shape of flared current tube with matching magnet tubes (FIGS. 7 and 8), or barrel-shaped current tube (FIG. 9), or indeed any rotationally symmetrical cylindrical shape.

The manufacture of any but regular simple cylindrical current tubes with fitted magnet tubes will pose a problem in MP-machine construction. Moreover, machines comprising current tubes and matching magnet tubes that are not simply cylindrical or have monotonically increasing diameter in one direction, will need to be assembled in sections.

Specifically, FIGS. 7 and 8 indicate uses of MP machines with flared current tubes as pumps or fluid-driven generators by means of propellers/impellers 85 inside the machine body, while FIG. 9 shows how an MP machine may provide thrust through propellers 85 that extend to the outside.

The examples of FIGS. 7 to 9 all relate to designs with stationary magnet tubes and therefore need electrical brushes. Making such machines brushless will require changes corresponding to those between FIGS. 2A and 2B. If as in FIGS. 7 to 9 axle 10 is omitted, its place may be taken by any stationary outside part that is equivalent to base plate 19 and axle supports 23 in FIG. 2, i.e. bedrock in FIGS. 7 and 8, and the support from which part 25 is suspended in FIG. 9.

As is the case for all designs of MP-A and MP-T machines according to the present invention, "axially extended" zones need not be straight and parallel to the rotation axis, even though this will be a preferred choice. Rather, the zones may be mildly spiraled or wavy, provided only that the S-ribbons in the current tube are shaped to periodically substantially overlap the zones, alternating with substantially overlapping the gaps between neighboring zones.

Possible Arrangements of the Sources of Magnetization in the Magnet Tubes

Figure 10:
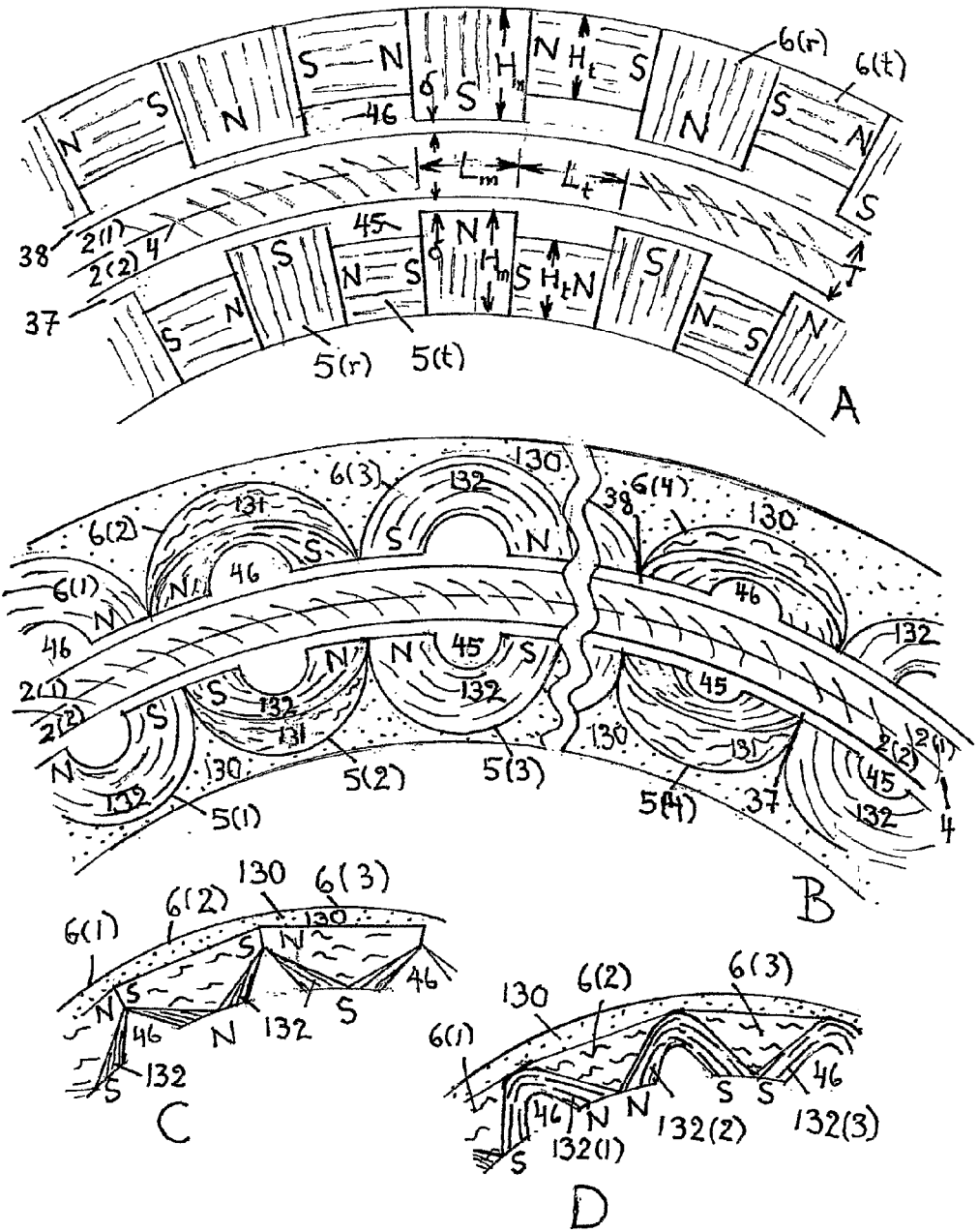
FIG. 10 shows a selection of possible magnet arrangements for MP-A and MP-T machines.

As already indicated, the arrangement of the sources of magnetization in the magnet tubes, that generate zones in the current tube is optional, as indeed is their nature. Above the discussion has centered on permanent magnets as the sources of magnetization although it could also be electromagnets, and among these Hallbach arrangements as in FIG. 10A have been the focus of attention. However, a wide range of alternative arrangements is possible of which examples are given in FIGS. 10B, 10C and 10D, wherein 130, with a dotted pattern, is a non-magnetic material such as a plastic, a rosin or a ceramic, 131, indicated by short wavy lines, is a flux return material, e.g. a magnetically soft iron alloy such as FeSi. Finally, 132, characterized by longer lines, is a permanent magnet material. Non-Hallbach arrangements are possible and may be best wherein flat magnets abut each other without leaving geometrical space but a gap in which the magnetic flux inverts.

Summary

Newly invented MP-A and MP-T machines generate or respond to AC or 3-phase current of controllable frequency. Their otherwise insulating current tube comprises at least one conductive "S-ribbon" with $N_z$ similar, axially extended sections that in preferred positions substantially overlap $N_z$ neighboring "zones" of strong radial magnetic fields of alternating orientation. In MP-A machine rotation, this gives rise to AC electromagnetic induction and in MP-T machines to 3-phase current. In "brushless" MP-A and MP-T machines, the current tube remains stationary and the magnet tubes rotate. This permits providing current tubes with multiple terminals that may be connected to outside components such as power supplies and/or sinks, without the need for slip rings and brushes. The zones between any two electrically connected terminals represent independent "sub-units" that may be used as motors, generators or the equivalent of transformer windings, whose voltages are proportional to the number of zones between the terminals. The expected power density of brushless 2-S-ribbon MP-A machines and of MP-T machines is mildly superior to that of corresponding MP-Plus machines. When protected with insulating, corrosion resistant coatings, brushless MP-A and MP-T machines may operate in hostile fluids, e.g. sea water.

The invention claimed is:

1. An electric machine capable of operating as an electric motor, an electric generator, or an electric transformer, comprising:
   multiple magnetic field sources surrounding at the outside and inside a current tube capable of conducting current;
   said current tube having a wall of substantially constant thickness; and
   said magnetic field sources establishing a magnetic flux density in a multiplicity of axially extended, regularly spaced zones in said wall; and
   said magnetic flux density alternating in radial orientation between neighboring zones; and
   said wall comprising at least one conductive elongated S-ribbon; and
   said S-ribbon shaped so as to alternatively substantially overlap a multiplicity of adjacent zones and substantially overlap the gaps between said zones when the current tube rotates relative to said magnetic field sources.

2. An electric machine according to claim 1, wherein said multiple magnetic field sources are permanent magnets that are attached to an outer magnet tube and an inner magnet tube such that they pair-wise face each other across the wall of said current tube.

3. An electric machine according to claim 1, wherein said current tube has a predetermined rotationally symmetrical cylindrical shape wherein lines between correlated points at the two current tube ends may be straight or curved.

4. An electric machine according to claim 2, wherein said outer magnet tube and said inner magnet tube are stationary and said current tube is rotatable.

5. An electric machine according to claim 2, wherein said outer magnet tube and said inner magnet tube are rotatable and said current tube is stationary.

6. An electric machine according to claim 1, wherein all surfaces of said current tube are protected by means of paint, varnish, lacquer or other protective coating for use of said machine in an aggressive fluid, including sea water.

7. A machine according to claim 4, wherein cooling fluid is passed through channels between radial magnets.

8. A machine according to claim 4, wherein at least one S-ribbon is made from at least one wire bundle that has been twisted and compacted.

9. A machine according to claim 4, wherein said current tube comprises multiple parts of S-ribbon sections of solid metal.

10. A machine according to claim 4, wherein the current tube comprises at least one joint between a current tube part comprising S-ribbon parts composed of wires and a current tube part comprising S-ribbon parts made of solid metal.

11. A machine according to claim 5, wherein a multiplicity of S-ribbons is subdivided into sub-units by providing insulating barriers.

12. A machine according to claim 11, wherein sub-units are provided with plugs for connecting selected sub-units to selected external electrical components.

13. A machine according to claim 2, wherein said current tube is constituted of a set of concentric, mechanically fused but electrically insulated current tube layers.

14. A machine according to claim 2, wherein said current tube comprises multiple layers of wire bundles that have been twisted and compacted.

15. An electric machine according to claim 2, wherein said current tube has a predetermined rotationally symmetrical cylindrical shape wherein lines between correlated points at the two current tube ends may be straight or curved.

16. An electric machine according to claim 15, wherein said outer magnet tube and said inner magnet tube are stationary and said current tube is rotatable.

17. An electric machine according to claim 15, wherein said outer magnet tube and said inner magnet tube are rotatable and said current tube is stationary.

18. An electric machine according to claim 15, wherein all surfaces of said current tube and magnet tubes are protected by means of paint, varnish, lacquer or other protective coating for use of said machine in an aggressive fluid, including sea water.

19. An electric machine according to claim 2, wherein all surfaces of said current tube and magnet tubes are protected by means of paint, varnish, lacquer or other protective coating for use of said machine in an aggressive fluid, including sea water.

20. An electric machine according to claim 4, wherein all surfaces of said current tube and magnet tubes are protected by means of paint, varnish, lacquer or other protective coating for use of said machine in an aggressive fluid, including sea water.

* * * * *